United States Patent [19]

Hensley

[11] Patent Number: 5,595,462

[45] Date of Patent: Jan. 21, 1997

[54] MACHINE TOOL COOLANT DELIVERY METHOD AND APPARATUS

[75] Inventor: Jerry C. Hensley, Macomb, Mich.

[73] Assignee: Western Atlas, Inc., Hebron, Ky.

[21] Appl. No.: 341,672

[22] Filed: Nov. 17, 1994

[51] Int. Cl.⁶ .......................... B23B 35/00; B23B 51/06
[52] U.S. Cl. ........................ 409/132; 408/1 R; 408/56; 408/61; 409/136
[58] Field of Search .................... 409/132, 136; 408/1 R, 10, 11, 56, 57, 60, 61

[56] References Cited

U.S. PATENT DOCUMENTS

| | | |
|---|---|---|
| 1,103,301 | 7/1914 | Lapointe . |
| 1,398,388 | 11/1921 | Mirrielees . |
| 1,738,646 | 12/1929 | Graves . |
| 1,905,506 | 4/1933 | Russell . |
| 2,140,838 | 12/1938 | Hart ............................ 29/105 |
| 2,190,858 | 2/1940 | Bennett ........................ 90/21 |
| 2,226,431 | 12/1940 | Hassman et al. ............... 90/11 |
| 2,333,147 | 11/1943 | Bonnafe . |
| 2,425,903 | 8/1947 | Vancil et al. .................. 90/21 |
| 2,723,405 | 11/1955 | Woodward ..................... 10/106 |
| 2,750,816 | 6/1956 | Mott ............................ 77/6 |
| 2,924,873 | 2/1960 | Knowles ....................... 29/106 |
| 3,570,332 | 3/1971 | Beake .......................... 408/61 |
| 3,726,363 | 4/1973 | Sussman ....................... 184/56 |
| 3,877,547 | 4/1975 | Willuweit et al. ............... 184/6 |
| 4,076,442 | 2/1978 | Cox, Jr. et al. ................. 408/8 |
| 4,095,916 | 6/1978 | Hammond ..................... 408/1 R |
| 4,168,925 | 9/1979 | Defresne ....................... 408/59 |
| 4,322,189 | 3/1982 | Briese ........................... 409/136 |
| 4,345,668 | 8/1982 | Gaunt .......................... 184/29 |
| 4,396,317 | 8/1983 | Staron et al. ................... 408/59 |
| 4,557,643 | 12/1985 | Cioci ........................... 409/136 |
| 4,597,697 | 7/1986 | Shaffer ......................... 408/61 |
| 4,598,617 | 7/1986 | Kubo et al. .................... 82/36 |
| 4,640,652 | 2/1987 | Rivera, Jr. ..................... 409/136 |
| 4,648,759 | 3/1987 | Ebenhoch ...................... 408/59 |
| 4,652,189 | 3/1987 | Mizoguchi ..................... 409/136 |
| 4,818,159 | 4/1989 | Mizoguchi ..................... 409/136 |
| 5,006,021 | 4/1991 | Wheetley ...................... 408/56 |
| 5,026,220 | 6/1991 | Yudovin et al. ................. 408/56 |
| 5,028,176 | 7/1991 | Delventhal et al. .............. 408/40 |
| 5,174,692 | 12/1992 | Martin ......................... 408/56 |

FOREIGN PATENT DOCUMENTS

| | | |
|---|---|---|
| 0120599 | 2/1986 | European Pat. Off. . |
| 3937216 | 5/1991 | Germany . |
| 56853 | 3/1986 | Japan . |
| 109645 | 5/1986 | Japan . |
| 130149 | 6/1987 | Japan . |
| 73249 | 3/1991 | Japan . |
| 221348 | 9/1991 | Japan . |
| 1298045 | 10/1987 | U.S.S.R. . |
| 1380874 | 3/1988 | U.S.S.R. ....................... 408/56 |

*Primary Examiner*—Daniel W. Howell
*Attorney, Agent, or Firm*—Barnes, Kisselle, Raisch, Choate, Whittemore & Hulbert

[57] ABSTRACT

A coolant delivery method and apparatus comprising a high and low pressure pump for providing high and low pressure coolant flow through a common conduit to a coolant orifice of a cutting tool of a machine tool or a nozzle of a workpiece flushing station. The high pressure pump has a cylinder with a reciprocable piston operably coupled to a drive for moving the piston to discharge coolant under high pressure to the cutting tool while a workpiece is machined by the tool. A one-way flow valve in the conduit permits coolant flow from the low pressure pump to reach the cutting tool as well as the high pressure pump cylinder to recharge the cylinder with coolant while the high pressure pump is not discharging coolant. Cutting tool failure as well as an orifice obstruction is detected by monitoring coolant flow from the high pressure pump during each machining cycle of machine tool operation. A signal is generated if high pressure coolant flow to the cutting tool during a machining cycle is not about the same as coolant flow during a calibration machining cycle where there is no cutting tool failure nor cutting tool orifice obstruction.

54 Claims, 7 Drawing Sheets

MACHINE TOOL COOLANT DELIVERY METHOD AND APPARATUS

FIELD OF THE INVENTION

This invention relates to a method and apparatus for delivering coolant to the cutting tool of a machine tool and more particularly to supplying coolant under pressure to the cutting tool while it is machining a workpiece for lubricating and cooling it and flushing chips therefrom while detecting failure of the cutting tool and obstruction of any coolant orifice or passage within the cutting tool that has become plugged.

BACKGROUND

Fluid coolant under pressure is typically supplied to the cutting tool of a machine tool while it is machining a workpiece for lubricating and cooling the cutting tool, as well as flushing chips of workpiece material from it and out of its path of travel, to increase machining efficiency and prolong the life of the cutting tool by preventing excessive chip buildup on the tool. Typically, the cutting tool has one or more coolant passages within it that each lead to an opening or coolant orifice for enabling coolant to be delivered to a cutting surface of the tool while it is engaged with the workpiece during machining. Coolant delivery systems that supply coolant to a cutting tool are usually classified as either low pressure or high pressure coolant delivery systems depending upon the pressure of coolant supplied to the tool. In assembly line applications, these systems are usually designed to deliver coolant to several cutting tools, typically as many as twenty, forty, sixty or more cutting tools.

For high speed rotary machining applications, such as milling, drilling, boring, reaming and tapping, a higher volume of coolant under a considerable amount of pressure must be provided at the cutting surface of the cutting tool as it is engaging the workpiece during machining for providing lubrication at points of contact between the tool and workpiece while also cooling the cutting tool. A large volume of coolant under high pressure is also needed to free the cutting tool of excessive chip buildup and flush chips of workpiece material out of its path of travel for preventing excessive loading of the tool during machining which can undesirably lead to premature failure of the cutting tool.

Unfortunately, excessive chip buildup can occur on the cutting tool even while high pressure coolant is being supplied. Excessive chip buildup on the cutting tool can obstruct coolant flow to the cutting tool and cause the tool to prematurely fail or, even worse, result in workpieces that are defectively machined. Additionally, reduced coolant flow to the cutting surfaces of the tool reduces lubrication between the cutting tool and workpiece thereby reducing machining efficiency and possibly decreasing machining quality. As such, obstructed coolant passages and premature cutting tool failure reduce machining efficiency, lower production rates and thereby increase machining costs.

At other times of high speed rotary cutting tool operation other than machining, at least some coolant flow to the cutting tool is required for simply cooling the tool. Additionally, many of these machine tools require coolant to cool and lubricate a rotating coolant coupling of the machine tool, called a rotary union, during those periods of operation when high pressure coolant is not being supplied to the cutting tool.

However, virtually all high pressure systems continuously operate a pump to supply coolant under high pressure to the cutting tool at all times, even when the cutting tool is not engaging the workpiece, such as when workpieces are being transferred into and out of the machine tool station, while the cutting tool is approaching the workpiece to machine it, and while the tool is being retracted from the workpiece after machining it. Other coolant delivery systems also have a source of lower pressure coolant and use separate coolant circuits for delivering coolant to those cutting tools requiring high pressure coolant and those cutting tools requiring lower pressure coolant. In these high-low pressure coolant delivery systems, a high pressure pump also continuously operates to supply coolant under high pressure to those high speed cutting tools that require high pressure coolant. A second low pressure pump continuously supplies coolant at a lower pressure to any machine tool, such as a broaching machine, which does not require high pressure coolant flow.

Similarly, at workpiece flushing stations requiring a high pressure stream of a fluid, typically coolant, directed through an orifice into a deep hole in a workpiece for cleaning it of chips and debris, the pump used to supply the fluid is a conventional rotary high pressure pump powered by an electric motor that runs continuously. Since the pump is running continuously, to stop coolant flow to the workpiece, such as when transferring the workpiece out of the station and while receiving another workpiece into the station, a fluid switching valve directs coolant back to a coolant supply or reservoir.

Typically, the high pressure pump operates continuously to avoid excessive pump wear and premature failure that undesirably would occur if the pump were cycled to supply high pressure coolant to the cutting tool only when needed. Therefore, many of these high-low pressure coolant delivery systems supply high pressure coolant continuously to cutting tools requiring it, both while the tool is machining the workpiece and when it is not in contact with any workpiece. As a result, continuous high pressure pump operation consumes excessive electrical power and reduces the life of filters required to remove sediment from the coolant before it reaches the cutting tool.

However, even if the high pressure pump could be economically cycled to provide high pressure coolant only when needed, some lesser flow of coolant must be supplied to rotary machine tools when the high pressure pump is not supplying coolant to the tool for cooling and lubricating the bearings of the rotary union as well as, preferably, cooling the tool. Variable pressure coolant pumps capable of providing both high and low pressure coolant flow from a single pump are not known and would likely be undesirably expensive and/or less reliable.

Other, simpler, coolant delivery systems use a pump that intermittently forces a coolant or lubricant to the cutting tool or other moving parts of the machine tool to lubricate them. Representative of these coolant and lubricant delivery systems are U.S. Patents: Mirrielees U.S. Pat. No. 1,398,338; Bennett U.S. Pat. No. 2,190,858; Bonnafe U.S. Pat. No. 2,333,147; and Shaffer U.S. Pat. No. 4,597,697. However, none of these systems supply coolant to the cutting tool at high pressure while machining the workpiece and low pressure during other times of machine tool operation. Furthermore, none of these systems sense coolant flow to the cutting tool for determining when there is an obstruction of a coolant passage or orifice of the cutting tool or tool failure.

SUMMARY OF THE INVENTION

A coolant delivery apparatus having a high pressure pump and a supply of low pressure coolant for delivering high and low pressure coolant to a rotary cutting tool of a machine tool station for supplying high pressure coolant to the cutting tool when needed, such as to lubricate and cool the tool during machining, and coolant at a lower pressure when high pressure coolant is not required, such as to cool the tool and lubricate a rotary union of the machine tool. To detect cutting tool failure or an obstruction of a coolant orifice of the cutting tool, the coolant delivery apparatus monitors the volume of coolant flow delivered to the cutting tool from the high pressure pump. Preferably, high pressure coolant flow to the cutting tool is monitored for every machining cycle of the machine tool and compared to a calibrated coolant flow value that is representative of high pressure coolant flow during a machining cycle where it is known that the cutting tool did not fail nor did its coolant orifice become obstructed. Preferably, machining is stopped and an operator of the machine tool is signaled to inspect the cutting tool if high pressure coolant flow to the tool during a machining cycle is not about the same as calibrated coolant flow.

Preferably, the high pressure pump provides coolant under pressure through a common conduit in fluid flow communication with the cutting tool during a high pressure coolant discharge cycle of each machining cycle of the machine tool. Preferably, high pressure coolant is supplied during the coolant discharge cycle at least while the cutting tool is machining a workpiece and, preferably, high pressure coolant is also supplied to the tool shortly before machining begins and shortly after machining is completed. Preferably, the low pressure coolant supply supplies coolant at a lower pressure to the cutting tool at all other times during machine tool operation for lubricating and cooling the cutting tool and rotary union of the machine tool and preventing hammer in the coolant conduit when high pressure coolant flow is initiated.

Preferably, the high pressure pump is a cylinder having a reciprocable piston therein that is operably connected to a drive for urging the piston from a retracted position toward an extended position to discharge high pressure coolant from the cylinder. To facilitate recharging the high pressure coolant discharge cylinder with coolant, the low pressure coolant supply preferably is a conventional fluid pump that draws coolant from a coolant supply, such as a reservoir, and pumps it through the coolant conduit to the high pressure coolant cylinder. Preferably, the low pressure pump also supplies coolant to the cutting tool and rotary union while the coolant cylinder is being recharged as well as after the cylinder is fully recharged, if necessary. To prevent the high pressure coolant cylinder from discharging coolant to the low pressure pump or into the reservoir, the coolant conduit has a one-way flow valve downstream of the cylinder and upstream of the low pressure pump and reservoir.

Coolant from a high pressure coolant cylinder can also be delivered to a nozzle or orifice of a high pressure flushing station for cleaning a hole of a workpiece fixtured at the station. The orifice is located relative to the workpiece to direct a stream of high pressure coolant from a high pressure coolant cylinder into the hole in the workpiece to flush chips of workpiece material and any other debris from the hole.

To determine cutting tool failure and orifice obstruction, a sensor, such as a proximity sensing switch, communicates to a computer when the high pressure coolant discharge cylinder is finished being recharged with coolant by sensing when the piston has reached its fully retracted position. Preferably, the computer measures the time it takes to recharge the cylinder after it has been discharged during the previous high pressure coolant discharge cycle, stores it for access and use by the computer and retrieves and compares the stored high pressure coolant cylinder recharge time with a stored calibrated value representing the time it should take to recharge the coolant cylinder following a coolant discharge cycle where the cutting tool has not failed during machining a workpiece nor has any coolant orifice or passage become obstructed. Preferably, the computer determines the high pressure coolant cylinder recharge time by measuring the time elapsed from when high pressure coolant flow from the cylinder is stopped after completing machining of the workpiece, enabling the low pressure pump to begin recharging the coolant cylinder, until the high pressure pump sensor indicates to the computer that the piston has reached its fully retracted position.

Objects, features and advantages of this invention are to provide a coolant delivery apparatus for supplying high and low pressure coolant to a cutting tool of a machine tool and which supplies high pressure coolant to the cutting tool only when needed during a machining cycle of the machine tool and at least while the cutting tool is machining a workpiece, provides high pressure coolant to the cutting tool to remove chips of workpiece material that have built up on the tool and flushes chips away from the tool for increasing machining efficiency, reduces energy and filtration requirements and conserves coolant use by supplying high pressure coolant to the cutting tool only when needed, provides low pressure coolant flow to the cutting tool and rotary union of the machine tool when high pressure coolant is not being supplied to the cutting tool to lubricate and cool the tool and rotary union, detects cutting tool failure for enabling the tool to be quickly changed thereby preventing a defective tool from machining another workpiece and increasing the efficiency and rate of production of the machine tool, detects an obstruction in a coolant orifice or passage of the cutting tool for enabling the obstruction to be quickly cleared or the tool changed to prevent defectively machining workpieces, is versatile because it can be used to supply coolant under high pressure to flush a hole in a workpiece in a high pressure flushing station, and, is reliable, flexible, durable and of simple and compact design and economical manufacture.

BRIEF DESCRIPTION OF THE DRAWINGS

These and other objects, features and advantages of this invention will be apparent from the following detailed description, appended claims and accompanying drawings in which:

DETAILED DESCRIPTION OF THE INVENTION

Figure 1:
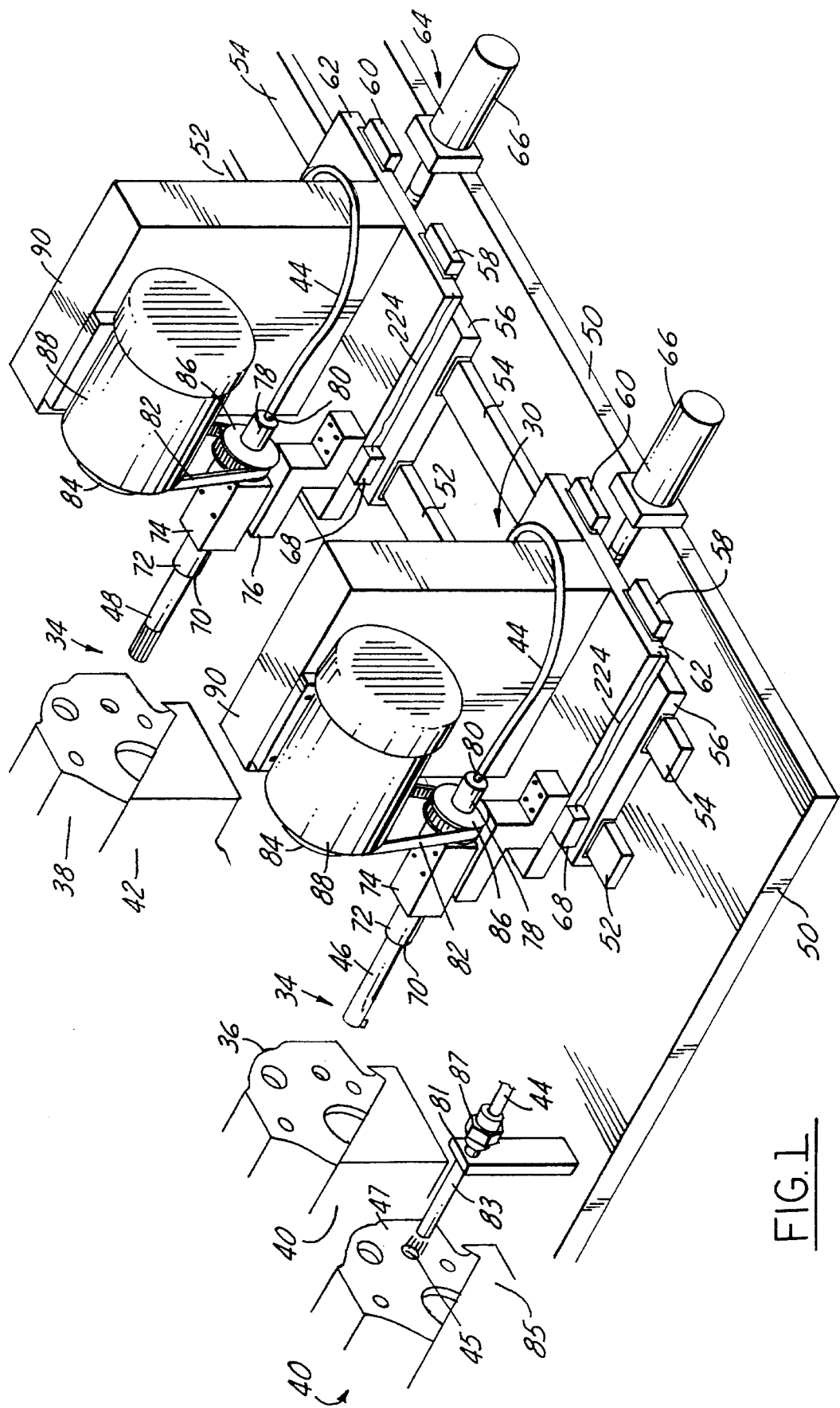
FIG. 1 is a perspective view of a pair of machine tools, one having a gun drilling tool and the other a reaming tool, and a flushing station for using high pressure coolant to clear chips and debris from a deep hole in a workpiece.

Referring in more detail to the drawings, FIG. 1 illustrates a pair of spaced apart machine tools 30 & 32 side-by-side, each having a cutting tool 34 for machining workpieces 36 & 38 located and clamped on fixtures 40 & 42, and a high pressure flushing station 43 for clearing debris from a deep hole 45 in a workpiece 47. Typically, during machine tool operation, a series of the workpieces is advanced into and out of the machine tools 30 & 32 by a suitable transfer mechanism, such as for example, a lift and carry transfer (not shown). During machining a workpiece, coolant under high pressure is provided to each cutting tool 34 through a flexible hose 44 for lubricating and cooling the tool 34 and flushing away chips of workpiece material that have built up on the tool 34 as well as out of the path of travel of the tool 34. When high pressure coolant is no longer required after machining has been completed, such as during its return stroke or while idle, coolant under low pressure is supplied through the hose 44 to the cutting tool 34 to cool and lubricate the machine tool and its cutting tool 34. Coolant under high pressure is supplied to the cutting tool 34 during a high pressure coolant discharge cycle that occurs during each machining cycle of the machine tool and which preferably extends from shortly before the tool 34 engages the workpiece 36 until shortly after the workpiece 36 has been completely machined by the tool 34.

During operation of each machine tool, the volume of high pressure coolant supplied to the cutting tool 34 during the high pressure coolant discharge cycle of each machining cycle is measured and compared with a calibrated value representing the volume of high pressure coolant metered to the cutting tool 34 during the high pressure coolant discharge cycle of a calibration machining cycle where a workpiece is machined without any failure of the cutting tool 34 nor any obstruction in coolant flow at the tool 34 occurring. Should the actual volume of high pressure coolant metered to the tool 34 during any machining cycle be less than the calibrated volume, the machine tool will signal an operator to inspect the cutting tool 34 for an obstruction in coolant flow. Should the actual volume of high pressure coolant supplied to the cutting tool 34 exceed the calibrated volume, the machine tool will signal the operator to inspect the cutting tool 34 for failure. Preferably, upon signaling the operator, the machine tool will permit no further machining to be performed until the operator inspects the cutting tool 34 and, if necessary, replaces it.

As is shown in FIG. 1, the cutting tool 34 of machine tool 30 is a gun boring tool 46 for drilling a deep hole in workpiece 36 and the cutting tool 34 of machine tool 32 is a reaming tool 48 for finely finishing a hole previously bored in the workpiece 38. Otherwise, both machine tools 30 & 32 are essentially identical and, for the purposes of explanation herein, only machine tool 30 and flushing station 43 will be described in further detail.

The machine tool 30 has a base 50, upon which are a pair of spaced apart transverse guideways 52 & 54 for permitting the tool 30 to be moved laterally from side to side. The machine tool 30 is carried on ways 52 & 54 by a lower platen 56 which in turn has a pair of spaced apart guideways 58 & 60 fixed to it that are generally perpendicular to guideways 52 & 54. An upper platen 62 rides on the guideways 58 & 60 for permitting the machine tool 30 to advance toward and be retracted away from the workpiece 36. Preferably, the upper platen 62 is advanced or retracted by a ball screw and nut assembly 64 driven by a servomotor 66, all of which are secured to the base 50. Although not shown, the lower platen 56, preferably, can also be moved side to side by such a ball screw and nut assembly driven by a servomotor, or it can be driven by another type of prime mover.

To sense when the cutting tool 34 has completely machined a workpiece 36, the machine tool 30 has a sensor 68 in communication with the machine tool 30. Preferably, the machining completed sensor 68 senses when the cutting tool 34 has been fed sufficiently far into the workpiece 36 during machining the workpiece 36 such that it has reached a full depth of cut position where it is known that the workpiece 36 has been completely machined by the tool 34. Preferably, after the machining completed sensor 68 determines that the cutting tool 34 has reached the full depth of cut position, the tool 34 is retracted from the workpiece 36, the workpiece 36 is unloaded from the fixture 40 and transferred out of the machine tool 30 and, thereafter, another workpiece is transferred into the machine tool 30 and fixtured for machining.

Although the machining completed sensor 68 is shown carried by the upper platen 62 in FIG. 1, the sensor 68 may communicate with the ball screw and nut assembly 64 or servomotor 66 to sense the position of the cutting tool 36 relative to the workpiece 36 to determine when the cutting tool 34 has completed machining the workpiece 36. For example, the machining completed sensor 68 may be in direct communication with the servomotor 66 to determine when the cutting tool 34 has reached the full depth of cut position in the workpiece 36 by monitoring how far the servomotor 66 has fed the cutting tool 34 into the workpiece 36 during machining. However, the machining completed sensor 68 may also be located elsewhere to indicate when the cutting tool 34 has completed machining the workpiece 36.

Each cutting tool 34 is received in a chuck 70 fixed to a spindle 72 journalled for rotation in a housing 74 mounted on a support 76 secured to the upper platen 62. The spindle 72 is driven through a timing belt 82 and cog pulleys 84 & 86 by an electric motor 88 mounted on a platform 90 secured to the upper platen 62. At its other end, the spindle 72 has a rotary union 78 with a fluid coupling 80 connected to the non-rotating flexible coolant hose 44 for enabling coolant to flow to the cutting tool 34 while permitting the spindle 72 and tool 34 to rotate relative to the hose 44 without the hose 44 twisting.

As is shown in FIG. 1, the flushing station 43 has a bracket 81 carrying a nozzle or orifice 83 located relative to the workpiece 47 to deliver a stream of high pressure coolant into the hole 45 of the workpiece 47, located and clamped in a fixture 85, for flushing chips of workpiece material and any other debris out of the hole 45. For example, the workpiece 47 may be an engine block having an oil galley hole or a transmission case with one or more hydraulic fluid passages requiring flushing. The nozzle 83 is attached by a coupling 87 to the flexible hose 44 enabling high pressure coolant to be delivered to the nozzle 83. The bracket 81 is preferably carried by the fixture 85 so that the the nozzle 83 can be quickly and easily located relative to the workpiece 47 to direct a stream of coolant under high pressure into its hole 45.

Figure 2:
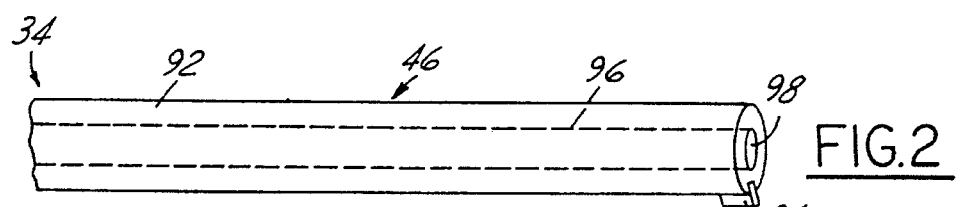
FIG. 2 is a partial perspective view of a gun boring tool showing a coolant orifice within the tool in phantom.

As is more clearly illustrated in FIG. 2, the gun boring tool 46 has a generally cylindrical elongate tube 92 with a carbide cutting tip 94 at its free end. To distribute coolant to its cutting tip 94, the gun boring tool 46 has an axial through bore or coolant passage 96 for supplying coolant received from the flexible hose 44 to a coolant discharge orifice 98 in its distal end, adjacent the carbide tip 94, to direct coolant onto the tip 94 during machining to lubricate and cool the tip 94 and flush chips of workpiece material away from it and out of its path of travel.

Figure 3:
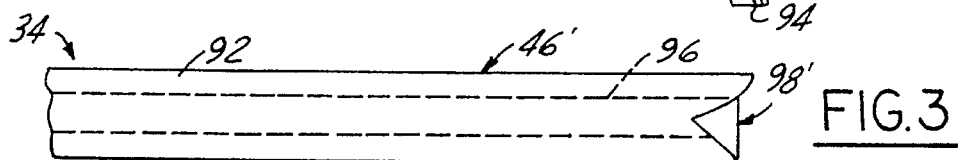
FIG. 3 is a partial perspective view of a gun boring tool that has failed.

FIG. 3 illustrates a gun boring tool 46' that has failed due to a broken carbide tip 94. Should the carbide tip 94 fail, coolant flow through the discharge orifice 98' increases and, after failure, the workpiece being machined will likely not be completely machined or may be defectively machined. If not quickly detected, one or even several workpieces can be defectively or incompletely machined before an operator of the machine discovers that the cutting tool 46' is defective.

Figure 4:
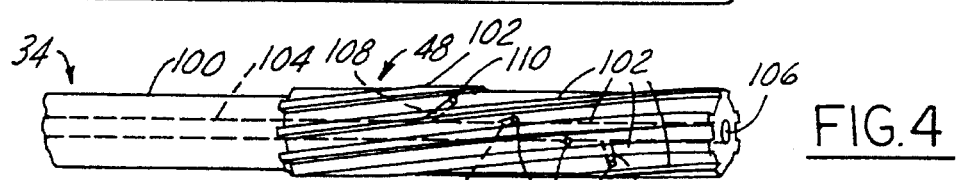
FIG. 4 is a partial perspective view of a reaming tool.

In FIG. 4, the reaming tool 48 has a generally cylindrical elongate tube 100 with a plurality of spiral flutes 102 at one end having a cutting surface between each pair of flutes 102. The reaming tool 48 has an axial through passage 104 with a discharge orifice 106 at its free end for directing coolant into the workpiece 38 during machining to flush chips away from the tool 48. To axially distribute coolant along the reaming tool 48 during machining, preferably, each flute 102 has at least one branch passage 108 that communicates with a discharge orifice or port 110.

Figure 5:
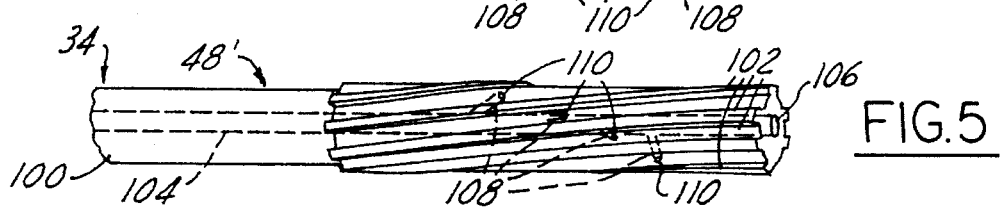
FIG. 5 is a partial perspective view of a reaming tool that has a coolant orifice plugged.

FIG. 5 illustrates a reaming tool 48' having an obstruction 112 in one of its coolant orifices 110 due to a particle of material, such as from the workpiece being machined, becoming lodged within the coolant orifice 110. This reduces coolant flow to the flutes 102 of the tool 48' which may cause one or more workpieces to be defectively machined, or, even worse, failure of the cutting tool, if the obstruction 112 is not detected in time.

Reaming and gun boring tools have been specifically described. However, the cutting tools 34 shown in FIGS. 1 through 3 could also be a boring bar, a milling tool, a lathe, a drill, a tapping tool or another machine tool that uses a high speed rotating cutting tool to machine a workpiece.

High-Low Pressure Coolant Delivery Apparatus

Figure 6A:
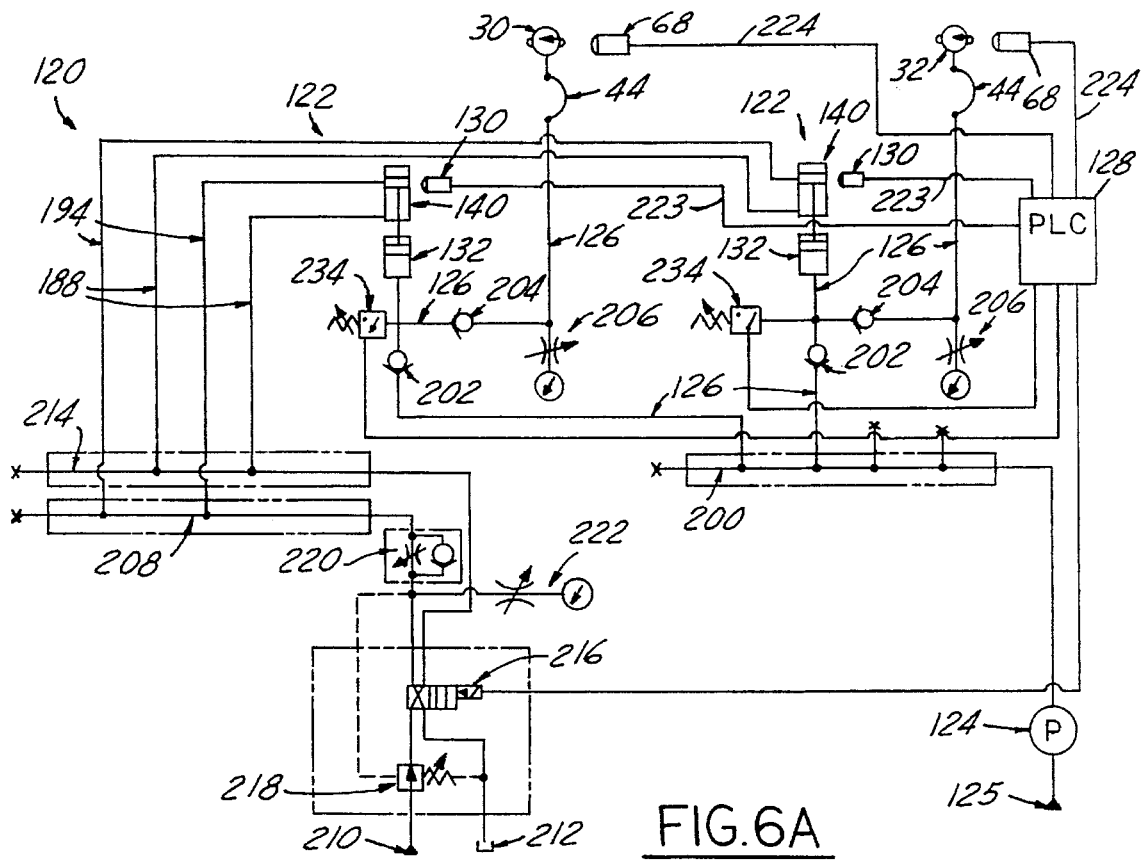
FIG. 6A is a schematic view of hydraulic, coolant and automatic control systems of one preferred embodiment of a coolant delivery apparatus of this invention.
Figure 6C:
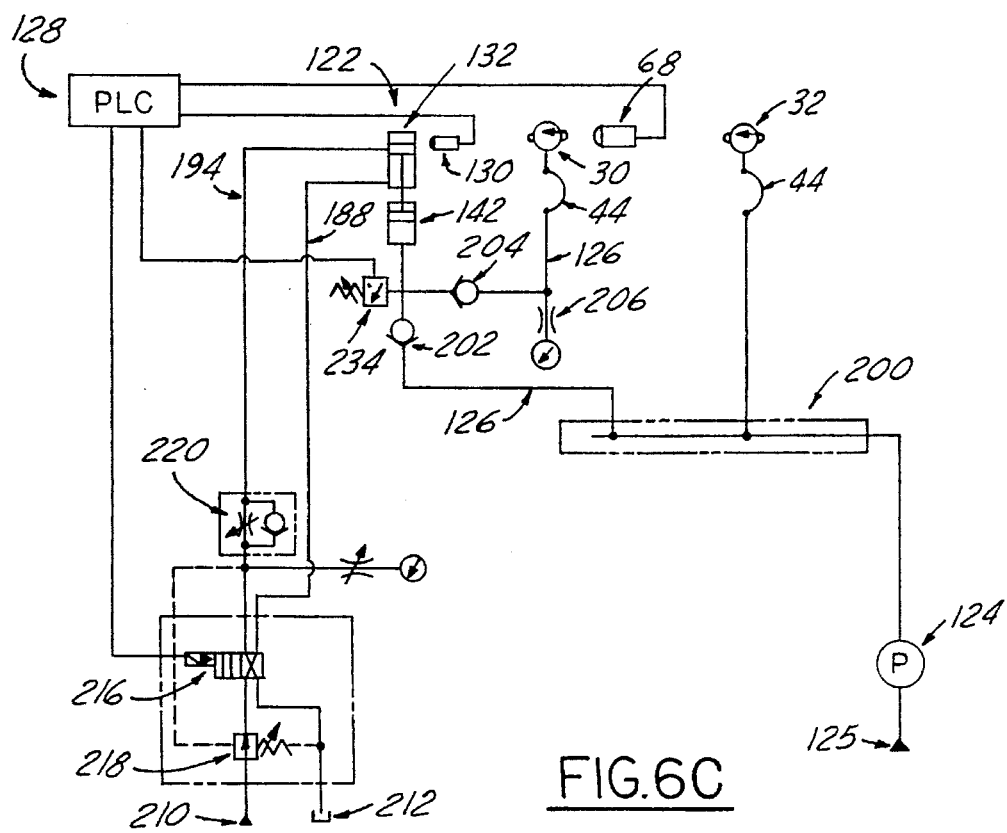
FIG. 6C is a schematic view of hydraulic, coolant and control systems of a third preferred embodiment of this invention.
Figure 6B:
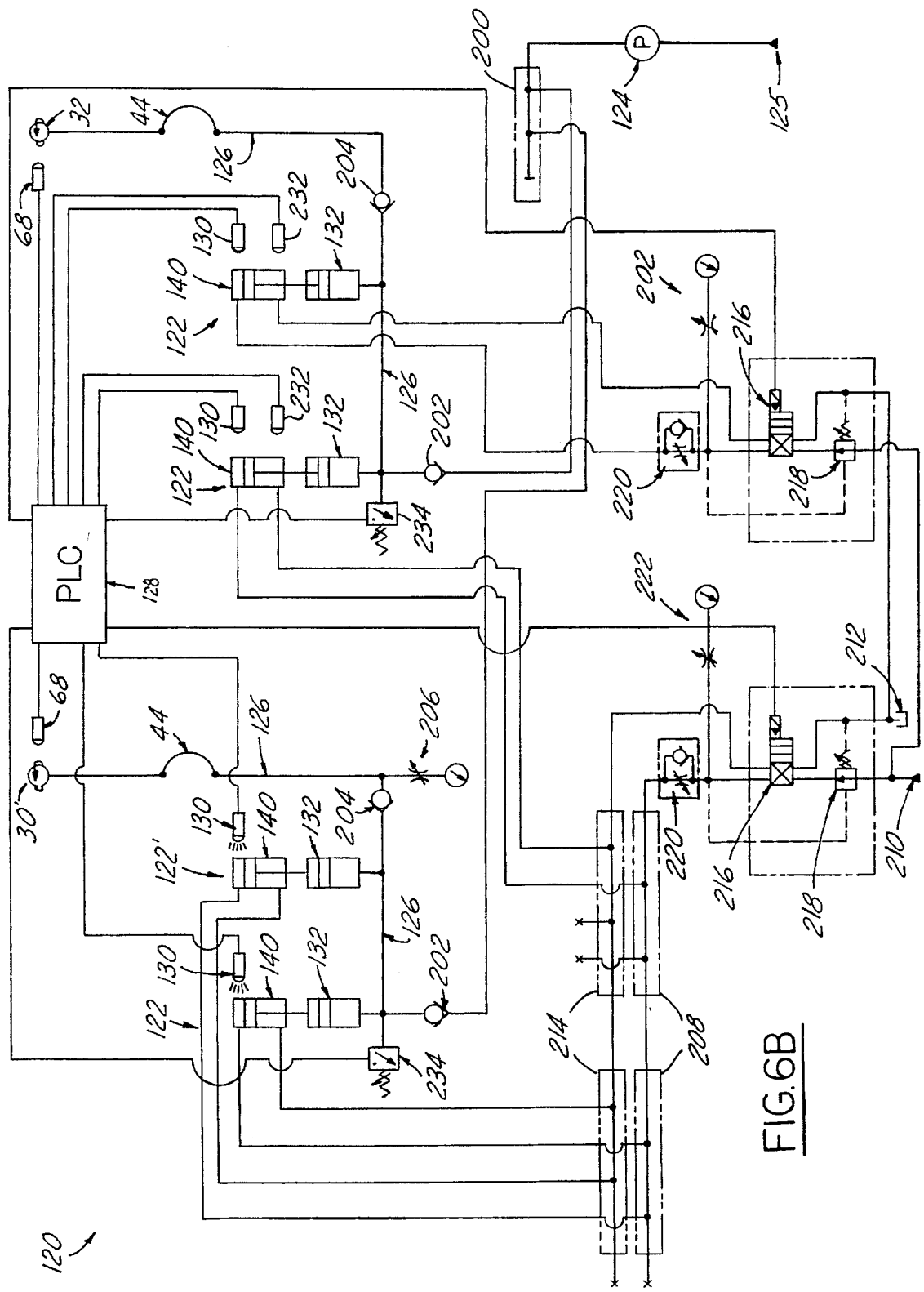
FIG. 6B is a schematic view of hydraulic, coolant and control systems of a second preferred embodiment of this invention.

As is depicted schematically in FIGS. 6A & 6B, a coolant delivery apparatus 120 of this invention has at least one high pressure pump 122 and a low pressure coolant supply or pump 124 that supply both high and low pressure coolant through a common conduit 126 to the cutting tool 34 of one or more machine tools during their operation. Preferably, coolant is supplied to both pumps from a common coolant supply, such as a reservoir 125. Preferably, high pressure coolant is supplied from the high pressure pump 122 to the cutting tool 34 only when necessary, such as preferably when the cutting tool 34 is machining the workpiece 36, thereby minimizing the amount of energy required to provide high pressure coolant to the tool 34, reducing the volume of coolant supplied to the cutting tool 34 during each high pressure coolant discharge cycle, and reducing the volume of coolant which must be filtered.

Preferably, the coolant delivery apparatus 120 has a computer 128, such as a programmable logic controller (PLC), that monitors each machine tool being supplied with high pressure coolant to determine whether its cutting tool 34 has failed or has an obstruction 112 in any coolant discharge orifice 98 or 106 or coolant discharge port 110. To provide early detection of cutting tool failure or an orifice obstruction 112, the PLC 128 monitors the machining-completed sensor 68 and another sensor 130 that is in communication with the high pressure pump 122 to determine high pressure coolant flow to the machine tool 30 during the high pressure coolant discharge cycle of each machining cycle. Should cutting tool failure or an orifice obstruction 112 be detected, the PLC 128 will preferably stop the machine tool 30 to prevent further machining from taking place until the tool 34 is inspected and, if necessary, replaced. Preferably, the PLC 128 will also signal an operator of the machine tool 30 to inspect the cutting tool 34 when such a fault condition is detected.

Figure 7:
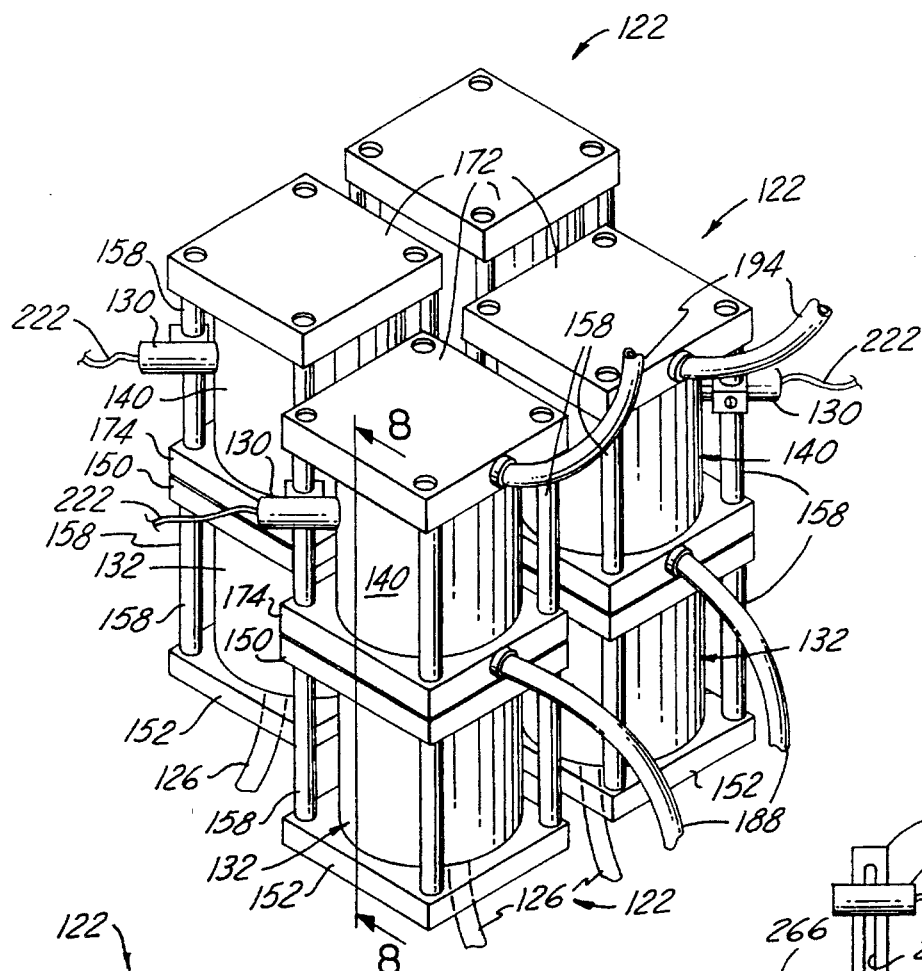
FIG. 7 is a perspective view of a bank of four coolant discharge cylinders.
Figure 8:
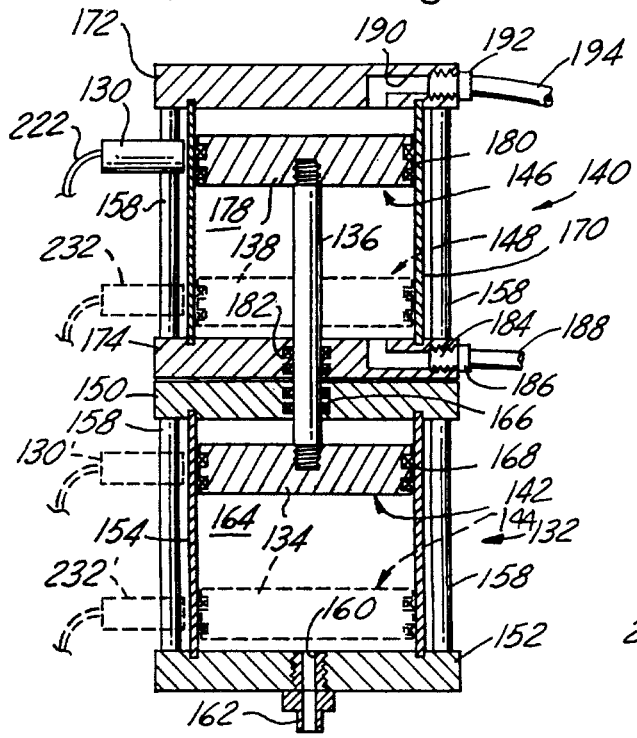
FIG. 8 is a cross sectional view of one of the coolant discharge cylinders shown in FIG. 7.

Referring to FIGS. 7 & 8, the high pressure pump 122 has a coolant cylinder 132 with a reciprocable piston 134 therein directly coupled by a rod 136 to another reciprocable piston 138 of a hydraulic cylinder 140 to force coolant from the coolant cylinder 132 under high pressure into the coolant conduit 126 which distributes it to the cutting tool 34. Typically, coolant is discharged from the high pressure coolant cylinder 132 to the cutting tool 34 and out the cutting tool orifice 98 at pressures of greater than about one hundred pounds per square inch (PSI) and, preferably, at pressures of several hundred PSI, or even higher, if required. Although a hydraulic cylinder 140 is depicted as the prime mover to reciprocate the coolant discharge piston 134, another prime mover could be used. For example, a servomotor could be operably connected to the coolant cylinder 132 by a ballscrew and nut assembly to move the coolant discharge piston 134 back and forth within the cylinder 132.

During operation of the high pressure pump 122, the coolant discharge piston 134 is reciprocated by the hydraulic cylinder 140 between a first or retracted position 142 and a position disposed from the first or retracted position, such as its fully extended position 144 shown in phantom in FIG. 8, to discharge coolant from the high pressure coolant cylinder 132 to the cutting tool 32 and, thereafter, facilitate recharging the cylinder 132 with coolant. Since the two pistons 134 & 138 are directly connected together by the piston rod 136 and, therefore, operate in tandem, the retracted and extended positions 146 & 148 (shown in phantom) of the hydraulic cylinder piston 138 are respectively also reached when the coolant discharge piston 132 reaches its retracted and extended positions 142 & 144.

During machining of the workpiece 36, as well as, preferably, shortly before the cutting tool 34 engages the workpiece 36, the hydraulic cylinder 140 forces the coolant discharge piston 134 to discharge coolant from the high pressure coolant cylinder 132 until machining is completed. Preferably, coolant is controllably forced continuously from the coolant cylinder 132 during the high pressure coolant discharge cycle of each machining cycle until shortly after completing machining of the workpiece. Preferably, the bore and stroke of the high pressure coolant cylinder 132 and piston 134 are chosen so that the high pressure pump 122 provides adequate flow of high pressure coolant to the cutting tool 34 during the entire high pressure coolant discharge cycle.

As is shown in FIG. 7, high pressure coolant cylinders 132 and hydraulic cylinders 140, preferably, are arranged in banks of two, three, four or more depending upon how many cutting tools 34 require high pressure coolant. As is illustrated more clearly in FIG. 8, preferably each hydraulic cylinder 140 is directly connected to and overlies its associated coolant cylinder 132 in a tandem cylinder arrangement.

As is shown in FIG. 8, each high pressure coolant cylinder 132 has top and bottom endwalls 150 & 152 spaced apart by a generally cylindrical sidewall 154 for defining a fluidtight cavity 156 for receiving the coolant discharge piston 134 therein. To retain the endwalls 150 & 152 in fluidtight engagement against the sidewall 154, the cylinder 132, preferably, has four spaced apart tie-rods 158 each having its ends secured to the endwalls 150 & 152. To enable coolant to enter and be expelled from the cylinder 132, the bottom endwall 152 has an opening 160 that is preferably threaded for fluidtightly threadably receiving a coupling 162 of the coolant conduit 126.

Within the high pressure coolant cylinder 132, the coolant discharge piston 134, preferably, threadably receives one end of the piston rod 136 which, in turn, extends through an opening in the top endwall 150 and into the hydraulic cylinder 140. The piston 134 and cylinder 132 define a chamber 164 for receiving coolant therein. To provide a seal for retaining coolant within the chamber 164, rings 168 are received in grooves in the piston 134 and bear on the cylinder sidewalls 154. Preferably, to provide a rod seal, the top endwall 150 has a pair of O-rings 166 received in grooves in its piston rod opening that bear on the piston rod 136.

To reciprocate the coolant discharge piston 134, preferably, the hydraulic cylinder 140 is a double-acting cylinder. It has a cylindrical sidewall 170 with top and bottom endwalls 172 & 174 secured together by tie-rods 158 and defining a fluidtight cavity within the cylinder 140. The cavity is divided into upper and lower chambers 176 & 178 by the hydraulic cylinder piston 138, which is threadably secured to the piston rod 136.

To prevent leakage of hydraulic fluid between the chambers 176 & 178, preferably, a pair of sealing rings 180 are received in grooves in the piston 138 and bear on the hydraulic cylinder sidewall 170. The bottom endwall 174 has an opening for accommodating the piston rod 136 and a rod seal provided by O-rings 182 received in grooves within the opening.

To enable hydraulic fluid to enter or be withdrawn from the lower chamber 178, the bottom endwall 174 has a port 184 that is preferably threaded for receiving a coupling 186 of a hydraulic line 188. As hydraulic fluid is introduced into the lower chamber 178 through the hydraulic line 188, the hydraulic cylinder piston 138 is retracted also moving the coolant discharge piston 134 of the high pressure coolant cylinder 132 toward its retracted position 142 thereby drawing coolant into its chamber 164 and recharging the high pressure coolant cylinder 132.

To enable hydraulic fluid to enter or be withdrawn from the upper chamber 176 of the hydraulic cylinder 140, its top endwall 172 has a port 190 that is preferably threaded for receiving a coupling 192 of a second hydraulic line 194. As hydraulic fluid from the hydraulic line 194 is introduced into the upper chamber 176 of the hydraulic cylinder 140, it extends the hydraulic cylinder piston 138 thereby also extending the coolant discharge piston 134 to force coolant from the high pressure coolant cylinder 132 through the coolant conduit 126 to the cutting tool 34.

Referring to FIGS. 6A & 6B, preferably, the low pressure pump 124 operates continuously during machine tool operation. The low pressure pump 124 withdraws coolant from the reservoir 125 and pumps it through the coolant conduit 126 to the cutting tool 34 when high pressure coolant is not being supplied to the tool 34. Preferably, low pressure coolant is supplied by the pump 124 during the return stroke of the machine tool 30, as well as, preferably, while the cutting tool 34 is idle to lubricate and cool the rotary union 78 and tool 34 while also providing coolant to the high pressure cylinder 132 for recharging it. Moreover, supplying coolant under low pressure through the coolant conduit 126 and flexible hose 44 to the cutting tool 34 also prevents hammer when high pressure coolant flow is initiated at the beginning of the high pressure coolant discharge cycle. Preferably, the low pressure pump 124 is a conventional rotary fluid pump.

To provide low pressure coolant to more than one cutting tool, the low pressure pump 124 is connected to a piping block or manifold 200 to supply coolant to each conduit 126 leading to a cutting tool. As is schematically depicted in FIG. 6A & 6B, a coolant conduit 126 extends from the piping manifold 200 to the cutting tool 34 and high pressure coolant cylinder 132 of each machine tool 30 & 32 so that the low pressure pump 124 can supply coolant to each cutting tool 34 and recharge the respective high pressure coolant cylinders 132 of each tool.

Each coolant conduit 126 connects both a high pressure pump 122 of the cutting tool and the low pressure pump 124 to the flexible hose 44 of its associated tool for distributing both high and low pressure coolant to the cutting tool 34 through the same conduit 126 and hose 44. To prevent backflow of coolant through the low pressure pump 124 and into the coolant reservoir 125 during operation of the high pressure pump 122, the conduit 126 has a one way valve 202, such as a check ball valve, between the high pressure coolant cylinder 132 and low pressure pump 124.

Preferably, the coolant conduit 126 also has a one-way flow valve 204 upstream of the cutting tool 34 and rotary union 78 and downstream of both the high pressure coolant cylinder 132 and low pressure pump 124 to prevent coolant from backflowing and draining from the tool 34 and union 78. Preferably, the coolant conduit 126 also has a needle valve and pressure gauge assembly 206 downstream of the coolant cylinder 132 and low pressure pump 124 to provide visual indication of the pressure of coolant being supplied to the cutting tool 34.

Figure 6D:
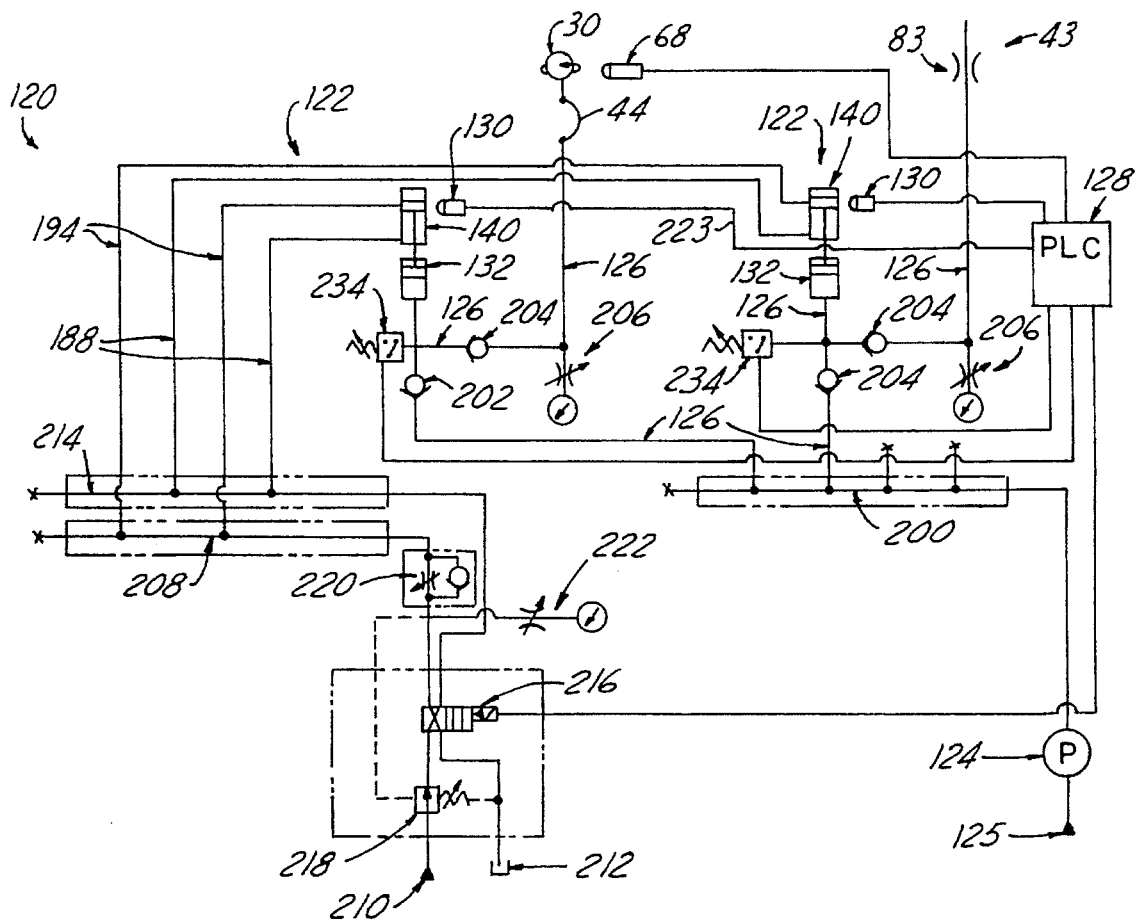
FIG. 6D is a schematic view of hydraulic, coolant and control systems of a modified embodiment of this invention which delivers high pressure coolant to both a machine tool and a workpiece flushing station.

Each cutting tool 34 requiring a supply of high pressure coolant during machining needs at least one high pressure coolant cylinder 132, while two or more cutting tools, preferably, can share a single low pressure pump 124. In this manner, the low pressure pump 124 can provide coolant to cutting tools 34 requiring only low pressure coolant during operation as well as tools 34 requiring both high and low pressure coolant during operation, or even a combination of both types of tools 34 as is shown in FIG. 6C. Similarly, the coolant delivery apparatus 120 can also provide high pressure coolant both to a cutting tool 34 and a high pressure workpiece flushing station 43 as is shown in FIG. 6D as well as a combination of cutting tools requiring only low pressure coolant, cutting tools requiring high and low pressure coolant and one or more high pressure workpiece flushing stations.

However, as is depicted in FIG. 6B, if desired, two high pressure coolant cylinders 132 can supply coolant to a single cutting tool 34 of a machine tool 30', with the cylinders 132 discharging at the same time to provide increased volume of high pressure coolant flow to the cutting tool 34 during the high pressure coolant discharge cycle. Alternatively, two high pressure coolant discharge cylinders 132 can be discharged sequentially, one after another, to provide high pressure coolant flow to a cutting tool 34 for an extended length of time. In fact, the coolant delivery apparatus 120 of this invention can be modified in light of the arrangements shown in FIGS. 6A, 6B & 6C to provide high and low pressure coolant to numerous cutting tools, such as is found in a typical machining assembly line.

Referring now only to FIG. 6A, to urge each coolant discharge piston 138 away from its retracted position to discharge coolant from its high pressure coolant cylinder 132, the upper chamber hydraulic lines 194 connect each hydraulic cylinder 140 to a piping block or manifold 208 that is in communication with a hydraulic fluid supply 210, such as a pump that draws hydraulic fluid from a reservoir or tank 212, preferably, in a closed system that continuously reuses the hydraulic fluid. For enabling the piston 138 of each hydraulic cylinder 140 to return to its retracted position 146 and facilitate recharging the high pressure coolant cylinder 132, the lower chamber hydraulic lines 188 connect each hydraulic cylinder 140 to a manifold 214 also in communication with the hydraulic fluid supply 210 and reservoir 212.

A two-position four-way solenoid-operated hydraulic fluid control valve 216 alternately switches the hydraulic fluid supply 210 between the upper and lower chamber hydraulic lines 194 & 188 to reciprocate the piston 138 of each hydraulic cylinder 140, and hence the coolant discharge piston 134, between their extended and retracted positions to alternately discharge and recharge the high pressure coolant cylinder 132. Alternatively, although not shown, a three-position, double solenoid-operated valve could also be used as the hydraulic fluid control valve 216. However, if two or more high pressure coolant discharge cylinders 132 are to be discharged sequentially, such as is depicted in FIG. 6B, a separate hydraulic fluid control valve 216 is preferably utilized for each hydraulic cylinder 140.

Preferably, the hydraulic fluid control valve 216 is energized by the PLC 128 to retain it in a recharge position, the position shown in FIG. 6A, to direct hydraulic fluid into the lower chamber 178 of the hydraulic cylinder 140 for urging both the hydraulic cylinder piston 138 and coolant discharge piston 134 towards their retracted positions to stop discharging high pressure coolant from the high pressure coolant cylinder 132 and begin recharging the cylinder 132 with coolant. Preferably, the PLC 128 switches the valve 216 to the recharge position after the machining-completed sensor 68 acknowledges to the PLC 128 that the workpiece 36 is completely machined and the cutting tool 34 requires no further high pressure coolant. The valve 216 is preferably left in the recharge position, even after the hydraulic cylinder piston 138 has reached its fully retracted position 146, until the high pressure coolant cylinder 132 is to be discharged during the next machining cycle of the machine tool 30.

Preferably, the hydraulic fluid control valve 216 is switched by the PLC 128 and retained in a discharge position, where the valve 216 is moved left of that shown in FIG. 6A, to direct hydraulic fluid into the upper chamber 176 of the hydraulic cylinder 140 to extend both the hydraulic cylinder piston 138 and coolant discharge piston 134 from their retracted positions to begin discharging coolant from the high pressure coolant cylinder 132. Preferably, the PLC 128 switches the valve 216 to the discharge position after the high pressure pump displacement sensor 130 indicates to the PLC 128 that the high pressure coolant cylinder 132 is fully charged with coolant and just before the cutting tool 34 begins machining the workpiece 36.

Preferably, there is a pressure reducing valve 218 downstream of the hydraulic fluid supply 210 for regulating pressure within the hydraulic lines 188 & 194. Preferably, there is a flow control valve 220 upstream of the upper chamber piping manifold 208 for regulating hydraulic fluid flow to the upper chamber 176 of the hydraulic cylinder 140 while the high pressure coolant cylinder 132 is being discharged. Preferably, there is also a needle valve and pressure gauge assembly 222 upstream of the upper chamber manifold 208 for providing visual indication of hydraulic fluid pressure in the upper chamber hydraulic lines 194.

During operation, the PLC 128 communicates with a high pressure switch 234 in each coolant conduit 126 that is downstream of the high pressure coolant cylinder 132 to determine whether high pressure coolant is being discharged to the cutting tool 34 during the high pressure coolant discharge cycle. Of course, should the PLC 128 determine that there is no high pressure coolant flow during any high pressure coolant discharge cycle, preferably, it will generate a signal to inspect the coolant delivery apparatus 120. Preferably, if the PLC 128 determines that there is no high pressure coolant flow to the cutting tool 34, the PLC 128 will also stop the tool 34 before it can begin machining the workpiece 36 to prevent possibly damaging the workpiece 36 as well as the tool 34.

So that the PLC 128 can determine the volume of high pressure coolant flow to the cutting tool 30 during the high pressure coolant discharge cycle of each machining cycle, the high pressure pump displacement sensor 130 is connected by an electrical cable 223 to the PLC 128 and the machining-completed sensor 68 is connected by another electrical cable 224 to the PLC 128. The high pressure pump sensor 130 is mounted on a tie-rod 158 of the hydraulic cylinder 140 and communicates to the PLC 128 when the high pressure coolant cylinder 132 is recharged by acknowledging when the hydraulic cylinder piston 138 has reached its fully retracted position 146. Preferably, the high pressure pump displacement sensor 130 is a proximity sensing switch for sensing when the piston is located adjacent to it and generating a signal provided to the PLC 128 when triggered by the piston. Alternatively, as is shown in phantom in FIG. 8, the sensor 130' could instead be mounted on a tie-rod 158 of the high pressure coolant cylinder 132 to indicate when the cylinder 132 is filled with coolant by directly acknowledging when the coolant discharge piston 134 is located at its fully retracted position 142.

Defective Cutting Tool Detection

To determine cutting tool failure or an obstruction in a coolant orifice or passage of the cutting tool 34, a value, AV, representing the volume of high pressure coolant flow to the cutting tool 34 during each high pressure coolant discharge cycle is determined and compared with another value, CV, representing the calibrated volume of coolant flow of high pressure coolant to the cutting tool 34 during a high pressure coolant discharge cycle of a calibration machining cycle where it is known that the cutting tool 34 has not failed nor has any coolant orifice of the cutting tool 34 become obstructed. If the actual volume, AV, of high pressure coolant flow to the cutting tool 34 is not about the same as the calibrated volume, CV, the machine tool 30 is preferably stopped from performing any further machining operations and, preferably, an operator of the tool 30 is signaled to inspect the cutting tool 34.

Figure 9:
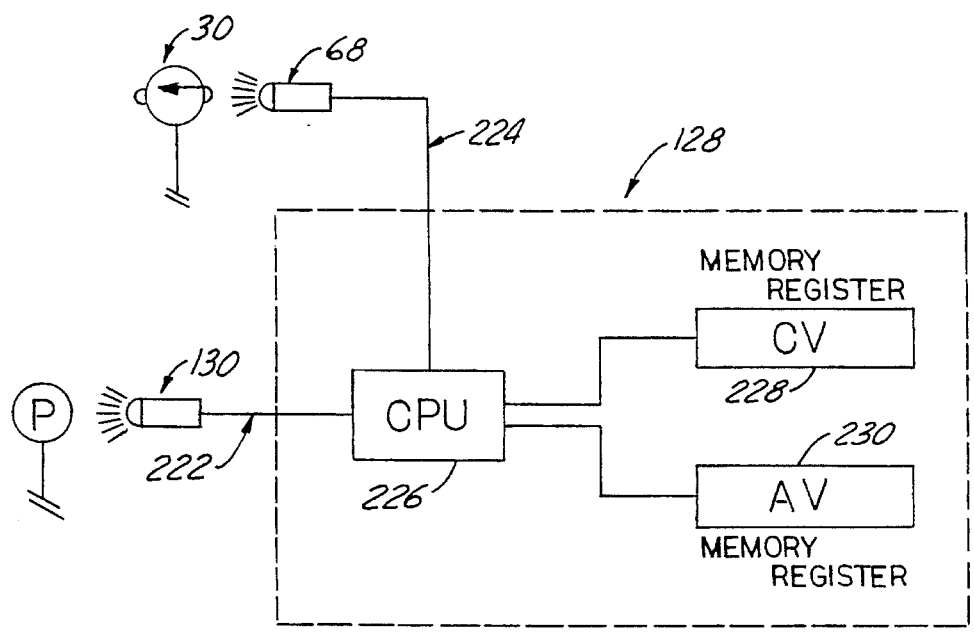
FIG. 9 is a simple schematic representation of the programmable logic controller depicted in FIGS. 6A, 6B & 6C.

Referring to FIG. 9, both the machining-completed sensor 68 and high pressure pump displacement sensor 130 communicate with a central processing unit (CPU) 226 of the PLC 128 during operation of the coolant delivery apparatus 120 for detecting a defective cutting tool condition. The value representing the calibrated volume of coolant flow is shown as CV in FIG. 9 and is stored in a memory register 228 of the PLC 128. During operation of the machine tool 30, the volume of high pressure coolant flow to the cutting tool 34 during each high pressure coolant discharge cycle is determined by the PLC 128 and stored in another memory register 230. This value, AV, is compared by the CPU 226 against the value representative of calibrated coolant flow volume, CV, to determine whether to stop the machine tool 30 and signal the operator to inspect the cutting tool 34.

Referring to FIGS. 6A & 8, when performing calibration, the volume of high pressure coolant flow to the cutting tool 34 is measured during a calibration machining cycle where high pressure coolant is delivered to the tool 34 during the high pressure coolant discharge cycle and where it is known that there is no cutting tool failure nor any obstruction of any coolant orifice or passage of the cutting tool 34. Preferably, in determining CV, the PLC 128 measures how long it takes for the cylinder 132 to recharge with coolant after discharging coolant to the cutting tool 34 during the coolant discharge cycle and stores the recharge time in the calibrated coolant flow volume memory register 228. The coolant cylinder recharge time, when measured during calibration, is representative of the coolant flow volume discharged by the high pressure coolant cylinder 132 since the bore and stroke of the high pressure coolant cylinder 132 are known and because the coolant discharge piston 134 preferably travels at a substantially constant speed during each coolant discharge cycle. Therefore, the time measured to recharge the high pressure coolant cylinder 132 is representative of the volume of coolant that was previously discharged from the cylinder 132 during the calibration coolant discharge cycle.

As is more clearly shown in FIG. 8, the PLC 128 detects that the coolant cylinder 132 is recharged when the high pressure pump displacement sensor 130 indicates to the PLC 128 that the hydraulic cylinder piston 138 is preferably in its retracted position 146 and, hence, that the coolant discharge piston 134 is also in its retracted position 142. Preferably, CV is determined by measuring the amount of time that elapses from when the PLC 128 switches the hydraulic fluid control valve 216 to its recharge position, causing the high pressure coolant cylinder 132 to begin recharging, until the high pressure pump displacement sensor 130 communicates to the PLC 128 that the coolant discharge piston 134 has reached its fully retracted position 142, indicating that the cylinder 132 is fully recharged with coolant.

Preferably, calibration is performed at the startup of the machine tool 30 or when the tool 30 is being setup to perform a new machining operation, such as on a differently configured workpiece or with a different cutting tool. However, in some instances, CV, may be predetermined and based upon various parameters of the coolant delivery apparatus 120 and/or machine tool 30 without needing to perform any such calibration machining cycles. Without limitation, these parameters for predetermining CV may be prior history of operation of the machine tool 30, as well as the bore and stroke of the high pressure coolant cylinder 132 and the known or calculated time for the cutting tool 34 to machine the workpiece 36.

Similarly, during actual operation of the machine tool 30, AV, is preferably determined by measuring the time it takes to recharge the coolant cylinder 132 after the high pressure coolant discharge cycle of every machining cycle. Preferably, this is done by measuring the amount of time that elapses from when high pressure coolant flow to the cutting tool 34 is stopped until the coolant cylinder 132 is recharged with coolant. Preferably, high pressure coolant flow to the cutting tool 34 is stopped when the machining-completed sensor 68 indicates to the PLC 128 that machining of the workpiece 36 has been completed because the cutting tool 34 has reached the full depth of cut position. Preferably, the PLC 128 determines that the high pressure coolant cylinder 132 is recharged when the high pressure pump displacement sensor 130 indicates that the hydraulic cylinder piston 138 has reached its fully retracted position 146. Preferably, AV is determined by measuring the amount of time that elapses from when the PLC 128 switches the hydraulic fluid control valve 216 to the recharge position until the high pressure pump displacement sensor 130 communicates to the PLC 128 that the coolant discharge piston 134 has reached its fully retracted position 142.

After the high pressure coolant discharge cycle of each machining cycle, the actual high pressure coolant cylinder recharge time, AV, is determined and stored in memory register 230 and is compared by the CPU 226 to the calibrated coolant cylinder recharge time, CV, previously stored in the corresponding memory register 228. If the actual coolant cylinder recharge time, AV, is not equal to or within an acceptable tolerance window of the calibrated coolant cylinder recharge time, CV, a fault condition signal is generated by the PLC 128 and provided to an operator of the machine tool 30.

Preferably, if the actual coolant cylinder recharge time, AV, is less than the calibrated coolant cylinder recharge time, CV, and not within an acceptable tolerance window of CV, thereby indicating that it took less time to recharge the coolant cylinder than it did during calibration due to an obstruction of a cutting tool coolant orifice, the operator is signaled to inspect the cutting tool 34 to clear the obstruction 112 or replace the tool 34. Preferably, if the actual coolant cylinder recharge time, AV, is greater than the calibrated coolant cylinder recharge time, CV, indicating that a greater volume of high pressure coolant was provided to the cutting tool 34 during that immediately preceding high pressure coolant discharge cycle than was provided during calibration, the operator is signaled to inspect the cutting tool 34 for failure and, if necessary, replace it.

For the machine tool 30 to continue normal operation so that it machines one workpiece after another without interruption, the actual coolant flow volume, AV, preferably, does not have to exactly equal the calibrated coolant flow volume, CV. Rather, the actual value, AV, preferably, need only be within a specified or predetermined tolerance window of the calibrated value, CV, such as for example, within±5% of CV, or a fixed tolerance volume window of CV, to account for relatively small variances in high pressure coolant flow discharged from machining cycle to machining cycle due to machining variations such as slight differences in workpiece hardness, surface irregularities, etc.

The CPU 226 may require a separate memory register 228 for each cutting tool 34 to store a value representative of calibrated coolant flow volume, CV, for each tool 34 if the PLC 128 monitors the coolant flow of more than one cutting tool, such as is depicted in FIGS. 6A & 6B, particularly, if the tools are different from each other or perform different machining operations. However, only one calibrated coolant flow value memory register 228 may be required if the cutting tools are the same and perform the same machining operation on similarly configured workpieces during their respective machining cycles. Preferably, the CPU 226 has separate memory registers 230 for each cutting tool 34 to store the value representative of actual coolant flow, AV, for each tool 34 monitored by the PLC 128.

Defective cutting Tool Detection using Dual Sensors

If it is preferred to measure the high pressure coolant flow volume to the cutting tool 34 during the actual high pressure coolant discharge cycle of each machining cycle rather than during the recharging of the coolant cylinder 132, another proximity sensor 232 or 232', shown in phantom in FIG. 8, can be mounted on a tie-rod 158. If such a two sensor arrangement is used to detect cutting tool failure or an orifice obstruction 112, such as sensors 130 & 232 or sensors 130' & 232' or even a combination thereof, the sensors can communicate with the PLC 128 to measure the time it takes for the high pressure coolant cylinder 132 to discharge a desired predetermined volume of coolant to the cutting tool 34 or whether the coolant cylinder 132 did discharge the desired predetermined volume of coolant to the cutting tool 34 during each high pressure coolant discharge cycle. Preferably, sensors 130 & 232 are adjustable on whatever tie-rod 158 they are mounted on so they can be properly positioned relative to the piston of cylinder 132 or 138 when calibrating the volume of the coolant delivery apparatus 120.

Discharge Time Detection

If two high pressure pump displacement sensors are used to measure the time it takes for the high pressure coolant cylinder 132 to discharge a predetermined amount of coolant to the cutting tool 34, preferably, the first high pressure pump displacement sensor 130 or 130' is located to detect the piston 134 or 138 in its retracted position 142 or 146 to indicate when the cylinder 132 is charged with coolant and the second high pressure pump displacement sensor 232 or 232' is located on a tie-rod 158 so that it detects the piston at a position disposed from its retracted position, such as, for purposes of illustrating operation of this arrangement, the extended position 144 or 148 shown in FIG. 8. Preferably, the second sensor 232 or 232' can be mounted on the tie-rod 158 so that it detects the piston 134 or 138 when the piston is anywhere between its fully retracted and fully extended positions so that it can be easily adjusted to accurately detect when the high pressure coolant cylinder 132 has discharged the desired predetermined volume. Therefore, the position of the sensor 232 or 232' can be quickly and easily adjusted if the cylinder is to discharge a different predetermined volume, such as may be required when the cutting tool 34 must machine a differently configured workpiece or if a different cutting tool is used, requiring more or less high pressure coolant during the coolant discharge cycle of each machining cycle.

Preferably, the second sensor 232 or 232' is located on the tie-rod 158 to detect when the coolant discharge piston 134 has completed forcing the desired predetermined amount of coolant from the coolant cylinder 132. Preferably, the desired predetermined volume of coolant discharged from the cylinder 132 is that volume of coolant which has been determined necessary to continuously supply high pressure coolant from the cylinder 132 to the cutting tool 34 throughout the entire high pressure coolant discharge cycle of each machining cycle of the machine tool 30.

To measure how much time the high pressure coolant cylinder 132 takes to meter the desired volume of coolant to the cutting tool 34, the first high pressure pump displacement sensor 130 or 130' preferably indicates to the PLC 128 when the piston 134 or 138 is at its retracted position 142 or 146 and the PLC 128 initiates timing when high pressure coolant begins discharging from the cylinder 132 at the beginning of the high pressure coolant discharge cycle until the second sensor 232 or 232' indicates the piston is adjacent to it, thereby, also indicating that the desired volume of coolant has been discharged from the cylinder 132. For this arrangement, AV is preferably determined by measuring the amount of time which elapses from when the the PLC 128 switches the hydraulic fluid control valve 216 to the discharge position, initiating high pressure coolant flow, until the second high pressure pump displacement sensor 232 or 232' communicates to the PLC 128 that the coolant discharge piston 134 has traveled to an extended position where it has forced the desired volume of coolant from the high pressure coolant cylinder 132. In the example depicted in FIG. 8, the sensor 232 or 232' communicates to the PLC 128 when the coolant discharge piston 134 has reached its desired extended position 144 ending timing of the high pressure coolant discharge cycle by the PLC 128.

To calibrate the coolant delivery apparatus 120 for this dual sensor arrangement, the PLC 128 measures the how much time it takes for the high pressure coolant cylinder 132 to discharge the desired volume during the high pressure coolant discharge cycle of a calibration machining cycle where there is no cutting tool failure or orifice obstruction and stores the discharge time as CV in memory register 228. Thereafter, the actual discharge time of the predetermined volume of coolant discharged from the high pressure coolant cylinder 132 is measured during the high pressure coolant discharge cycle of each machining cycle and stored as AV in memory register 230 and compared to CV to determine cutting tool failure or orifice obstruction.

Preferably, the PLC 128 will stop operation of the machine tool 30 and generate a signal, such as a fault condition signal, if the actual coolant discharge time, AV, differs from the calibrated coolant discharge time, CV, and does not fall within an accepted discharge time tolerance window of CV. Preferably, the PLC 128 will generate a fault condition signal indicating that the cutting tool 34 has failed if the actual coolant discharge time, AV, is less than the calibrated coolant discharge time, CV, indicating that the high pressure coolant cylinder 132 discharged the desired volume of coolant more quickly than it should have due to an increased rate of flow through the cutting tool 34. Preferably, the PLC 128 will generate a fault condition signal indicating that there is an obstruction 112 in a coolant orifice of the tool 34 if AV is greater than CV, indicating that the coolant cylinder 132 discharged the desired volume of coolant more slowly than it should have due to the obstruction 112.

Discharge Volume Detection

If a two sensor arrangement is used to measure whether the high pressure coolant cylinder 132 has metered the desired volume of coolant to the cutting tool 34 during the high pressure coolant discharge cycle of every machining cycle, the first high pressure pump displacement sensor 130 or 130' is preferably located adjacent the fully retracted position 142 or 146 of the coolant discharge piston 134 or the hydraulic cylinder piston 138 to detect when the high pressure coolant cylinder 132 is fully charged with coolant. The second high pressure pump displacement sensor 232 or 232' is also located on a tie-rod 158, such as is shown, so that it detects when the coolant discharge piston 134 has been extended sufficiently far from its retracted position such that the piston 134 has discharged the desired predetermined volume of coolant from the high pressure coolant cylinder 132 to the cutting tool 34.

To detect cutting tool failure or an orifice obstruction, high pressure coolant is supplied to the cutting tool 34 during the high pressure coolant discharge cycle of each machining cycle and the high pressure coolant cylinder 132 is monitored to determine if it has discharged the desired predetermined volume during the coolant discharge cycle. The second high pressure pump displacement sensor 232 or 232' is located on the tie-rod to communicate to the PLC 128 when the coolant discharge piston 134 has forced the desired predetermined volume of coolant from the high pressure coolant cylinder 132.

To detect cutting tool failure or an orifice obstruction, the PLC 128 simply needs to communicate with the second sensor 232 or 232' to determine whether the piston triggers the sensor 232 or 232' during the high pressure coolant discharge cycle, while recharging the high pressure coolant cylinder 132, or does not trigger the sensor at all. If the PLC 128 determines that the coolant cylinder piston 134 did not trigger the sensor 232 or 232' during the coolant discharge cycle, indicating that the cylinder 132 did not discharge the desired volume of coolant, the PLC 128 will signal an operator of the machine tool 30 that there is an orifice obstruction 112. However, if the PLC 128 determines that the sensor 232 or 232' was triggered both during coolant delivery and while recharging the high pressure coolant cylinder 132, indicating more coolant was discharged than desired, the PLC 128 will signal the operator that the cutting tool 34 has failed so it can be inspected and, if necessary, replaced. Of course, if the PLC 128 determines that the sensor 232 or 232' was triggered only once during the entire machining cycle, no fault condition signal will be generated and normal machine tool operation will continue uninterrupted.

High Pressure Flushing Station

The coolant delivery apparatus 120 is schematically shown in FIG. 6D delivering high pressure coolant both to a machine tool 30, such as is also depicted in FIG. 6A, and the high pressure workpiece flushing station 43 shown in FIG. 1. As is shown in FIG. 6D, for the flushing station 43, the PLC 128 does not require a machining-completed sensor 68 since no machining is occurring at the station 43. Before beginning the high pressure coolant discharge cycle, the workpiece 47 is located and clamped in the fixture 85 such that the coolant discharge nozzle 83 is located adjacent the workpiece hole 45 so it will direct a stream of high pressure coolant into the hole 45 during the high pressure coolant discharge cycle. Although not shown, depending upon the volume of the high pressure coolant cylinder 132 and the volume and pressure of coolant required, several coolant discharge nozzles 83 can receive coolant from the cylinder 132 substantially simultaneously for flushing several holes in a single workpiece at a single flushing station or holes in more than one workpiece at more than one flushing station.

As is depicted in FIG. 6D, the high pressure coolant discharge cycle of the flushing station 43 is of the same duration as the discharge cycle of the cutting tool 34 shown since the hydraulic fluid switching valve 216 substantially simultaneously controls high pressure coolant flow to both the cutting tool 34 and flushing station 43. However, if it is desirable or necessary to sequence high pressure coolant flow to the flushing station 43 differently from when the cutting tool 34 requires high pressure coolant flow, a second hydraulic fluid switching valve (not shown in FIG. 6D) can be used to control and sequence high pressure coolant flow only to the flushing station 43.

Although the check valve 204 downstream of the high pressure coolant cylinder 132 prevents fluid from backflowing and draining from the nozzle 83, such as while the high pressure coolant cylinder 132 is being recharged, coolant from the low pressure pump can flow through the nozzle when there is no high pressure coolant flow. If it is desirable to completely cease coolant flow through the nozzle 83 when high pressure coolant flow to the flushing station 43 is not required, a hydraulic fluid switching valve (not shown) can be used to prevent coolant flow through the nozzle 83 at all times other than during the high pressure coolant discharge cycle of the flushing station 43.

Second Preferred Embodiment

Figure 10:
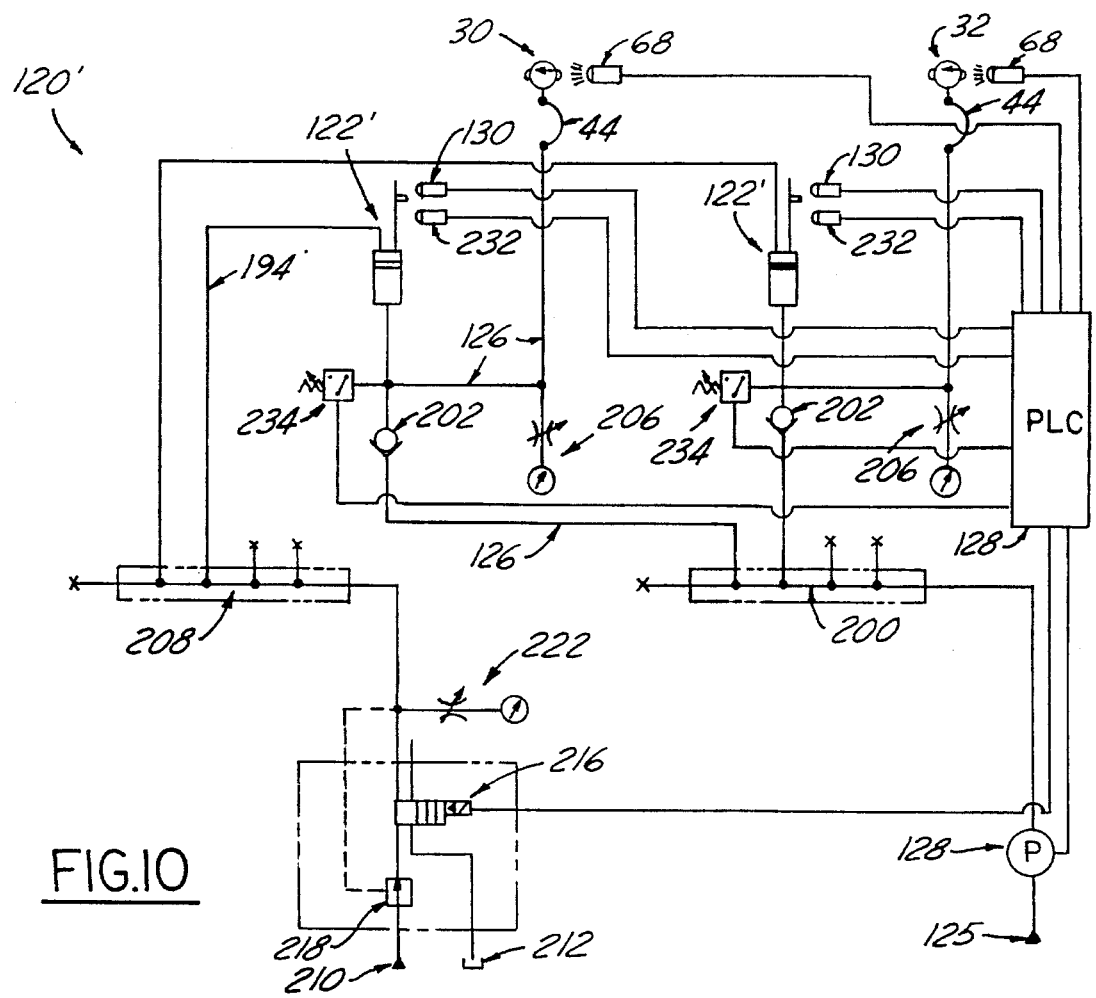
FIG. 10 is a schematic view of the hydraulic, coolant and control systems of another preferred embodiment of this invention utilizing a different form of a coolant discharge cylinder.

A second preferred embodiment of the coolant delivery apparatus 120' of this invention is schematically depicted in FIG. 10. This coolant delivery apparatus 120' is similar to the coolant delivery apparatus 120 illustrated in FIG. 6A except that it uses a different form of a high pressure pump 122' that is more clearly illustrated in FIGS. 11 & 12. Since the check valve 204 downstream of the high and low pressure pumps is not absolutely needed for operation of the coolant delivery apparatus 120 or 120', it is eliminated from the apparatus 120'. Additionally, since only low pressure coolant from the low pressure pump 124 is used to recharge the high pressure pump 122', only one piping manifold 208 is used to supply hydraulic fluid to the two high pressure pumps 122' shown in FIG. 10. Although, a two-position four-way solenoid-operated hydraulic fluid control valve 216 is used to communicate hydraulic fluid to the high pressure pump 122' to cause it to discharge high pressure coolant, another suitable hydraulic fluid control valve, such as a two-position two-way solenoid operated valve, could instead be used.

Figure 12:
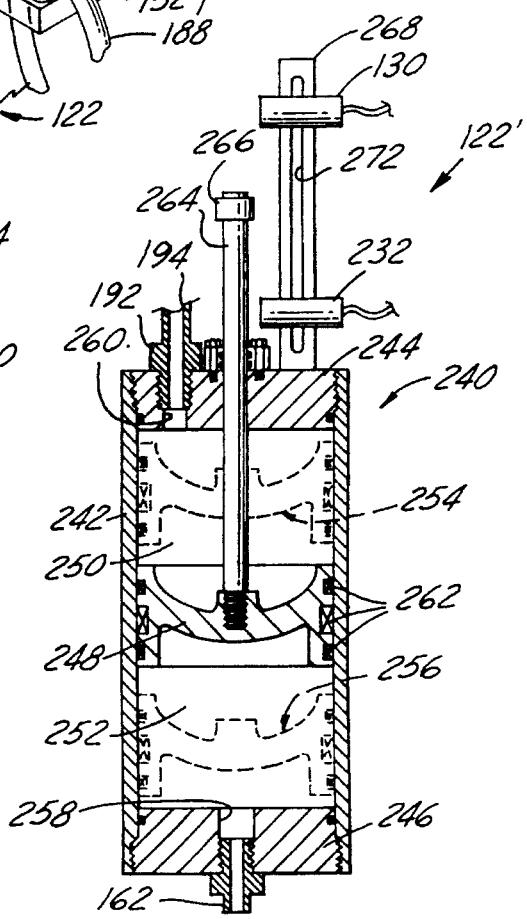
FIG. 12 is a cross sectional view of the coolant discharge cylinder illustrated in FIG. 11.

As is shown in FIG. 12, each high pressure pump 122' has a cylinder 240 with a cylindrical sidewall 242 and a top endwall 244 and bottom endwall 246 each secured by threads and sealed by an O-ring to the sidewall 242 for defining a cylindrical cavity in which a piston 248 is received. As is shown, the piston 248 divides the cavity into an upper chamber 250 for preferably receiving hydraulic fluid therein and a lower chamber 252 for receiving coolant therein. Preferably, the piston 248 is reciprocable between a retracted position 254, shown in phantom in FIG. 12, and an extended position 256, also shown in phantom, to alternately discharge coolant from the cylinder 240 and recharge it with coolant.

To permit flow of coolant into and out of the lower cylinder chamber 252, the bottom endwall 246 has a threaded passage 258 for fluidtightly receiving the coupling 162 of the coolant conduit 126. To permit flow of hydraulic fluid into and out of the upper chamber 250, the top endwall 244 has a threaded passage 260 for fluidtightly receiving the coupling 192 of hydraulic line 194. A seal is provided by a plurality of rings 262 received in grooves in the piston 248 and which bear on the cylinder sidewall 242.

To communicate the position of the coolant discharge piston 248 to the PLC 128 during operation, a rod 264 is preferably threadably secured at one end to the piston 248 and extends out from the cylinder 240 with a trip 266 adjacent its opposite end for triggering the first pump displacement sensor 130 and second pump displacement sensor 232 when the trip 266 is next to the sensor. A rod seal is provided by at least one O-ring received in a complementary groove in the rod opening in the top endwall 244 and which bears on the rod 264.

Figure 11:
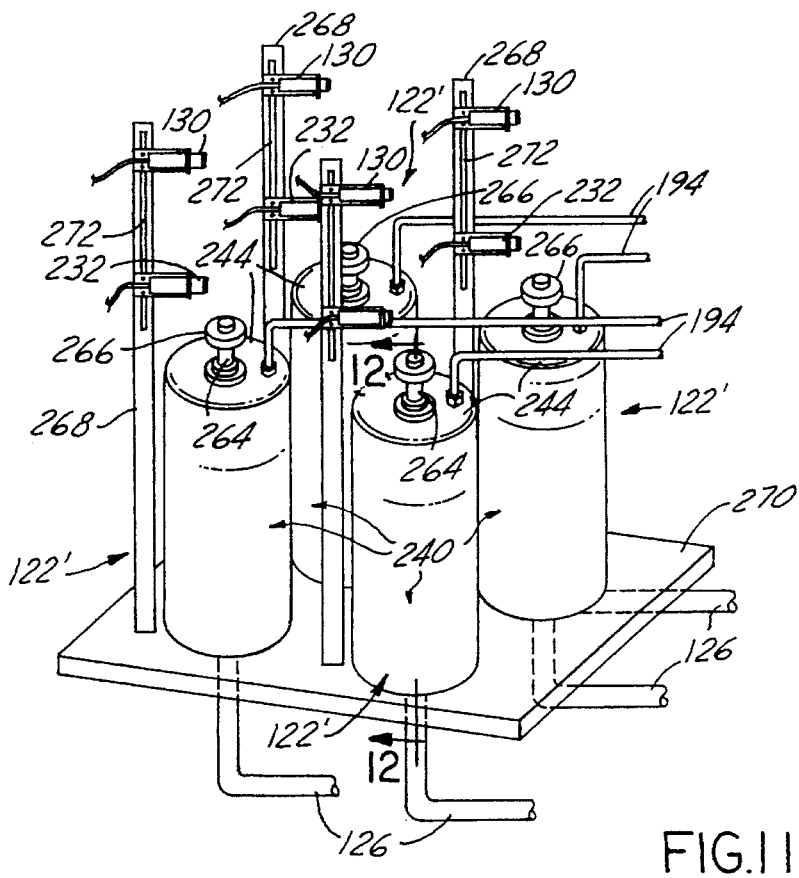
FIG. 11 is a perspective view of a bank of four coolant discharge cylinders of the second form.

As is also shown in FIG. 11, each pump displacement sensor 130 & 232 is mounted on an upright 268 extending from a base 270 carrying the high pressure pump cylinders 240, although, the upright 268 could be mounted directly to the cylinder 240, if desired. To permit each pump displacement sensor to be adjusted, such as for positioning the sensors 130 & 232 to detect when the cylinder 240 has discharged a desired predetermined amount of coolant from it, such as during calibration, the upright 270 has a longitudinally extending mounting slot 272. Preferably, the pump displacement sensors 130 & 232 are mounted on the upright 270 and located to respectively detect the trip 266 when the coolant discharge piston 248 is at its fully retracted position 254 and extended position 274 for detecting when the desired predetermined volume of coolant has been discharged from the high pressure coolant cylinder 240. Preferably, the predetermined volume of coolant discharged from the cylinder 240 is the amount of coolant necessary to continuously supply high pressure coolant to the cutting tool 34 during the high pressure coolant discharge cycle of each machining cycle.

Preferably, cutting tool failure or a plugged coolant orifice is detected by the PLC 128 communicating with each sensor 130 & 232 to time how long it takes to discharge the desired predetermined volume of coolant or determine whether more or less than the predetermined volume is discharged during the high pressure coolant discharge cycle. Alternatively, detection of cutting tool failure or orifice obstruction may be done using only one proximity sensor 130 and measuring the time elapsed during recharging the lower chamber 252 with coolant and comparing the elapsed time with a calibrated recharge time as was previously discussed.

Use and Operation

In operation of the coolant delivery apparatus 120 illustrated in FIG. 6A, upon startup, low pressure coolant is supplied by the low pressure pump 124 to the rotary union 78 and cutting tool 34 of the machine tool 30. Low pressure coolant is preferably also supplied to the rotary union 78 and cutting tool 34 while a workpiece 36 is loaded into the workstation 30 and located and clamped in the fixture 40 in preparation for machining. Preferably, high pressure coolant is supplied to the cutting tool 34 during the high pressure coolant discharge cycle including shortly before the cutting tool 34 begins machining the workpiece 36, while it is machining the workpiece 36, and for at least a short period of time after machining is completed. If desired, high pressure coolant can be supplied while the cutting tool 34 is in engagement with the workpiece 36 after machining is completed and until the tool 34 is retracted from the machined workpiece. Preferably, low pressure coolant is immediately again supplied to the cutting tool 34 after high pressure coolant flow to the tool 34 ceases.

While low pressure coolant is being supplied to the cutting tool 34 after the workpiece 36 has been loaded, located and fixtured, as can be more clearly understood by referring to FIG. 1, the servomotor 66 rapidly advances the upper platen 62 and, hence, the cutting tool 34 toward the workpiece 36. As the cutting tool 34 nears the workpiece 36, the servomotor 66 preferably slows the approach of the cutting tool 34 and high pressure coolant flow to the tool 34 is started.

Preferably, the servomotor slows down the approach of the cutting tool 34 until the tool 34 is moving toward the workpiece 36 at the desired rate of speed that is its desired feed rate for the particular type of cut being made or machining performed. After high pressure coolant flow to the tool 34 is started, the PLC 128 monitors the high pressure coolant switch 234 and continues feeding the tool 34 toward the workpiece 36 if the high pressure switch 234 indicates to the PLC 128 that there is high pressure coolant flow.

Feeding of the cutting tool 34 into the workpiece 34 at the desired machining feed rate continues after the PLC 128 determines high pressure coolant is flowing to the tool 34. However, if the PLC 128 detects that no high pressure coolant is flowing to the cutting tool 34, the PLC 128 preferably stops the cutting tool 34 before it engages the workpiece 36 to prevent it from defectively machining the workpiece 36 or damaging the tool 34. Once the PLC 128 detects there is no high pressure coolant flow, it preferably signals the operator so the coolant delivery apparatus can be inspected.

When coolant under high pressure is introduced by the high pressure pump 122 to the cutting tool 34, low pressure coolant flow to the tool 34 ceases. To lubricate and cool the cutting tool 34 while flushing chips of workpiece material out of its path of travel as it is fed into the workpiece 36 during machining, at the beginning of the high pressure coolant discharge cycle high pressure coolant is supplied to the cutting tool 34 before it engages the workpiece to machine it. High pressure coolant is also preferably supplied to the cutting tool 34 for a short time after machining is completed to cool the tool 34 and clear debris from the tool 34 and workpiece 36 as well as any of the coolant orifices of the tool 34. Preferably, high pressure coolant flow stops when the cutting tool 34 dwells after reaching its full depth of cut position within the workpiece 36 upon completing the machining of the workpiece 36.

After the cutting tool 34 has completed its dwell upon machining the workpiece, low pressure coolant flow preferably immediately resumes as the high pressure coolant flow ceases. Preferably, low pressure coolant is continuously supplied to the rotary union 78 and cutting tool 34 as the tool 34 is withdrawn from the workpiece 36 and the platen 62 is, preferably, rapidly retracted away from the workpiece 36. Preferably, low pressure coolant is also supplied to the rotary union 78 and tool 34 while the workpiece 36 is unloaded from the machine tool 30 and thereafter another workpiece is loaded, located and fixtured for machining. Preferably, low pressure coolant is provided to the union 78 and tool 34 at all times of machine tool operation when high pressure coolant is not being supplied to the cutting tool 34.

At the startup of machine tool operation, the low pressure pump 124 supplies coolant through the piping manifold 200 to the coolant conduit 126 where it is in turn distributed to the high pressure coolant cylinder 132 of the high pressure pump 122 to recharge it, if not already filled with coolant, and to the rotary union 78 and cutting tool 34 through the flexible hose 44. To facilitate recharging the coolant cylinder 132, the hydraulic fluid control valve 216 is positioned by the PLC 128 in the recharge position, as is shown in FIG. 6A, to retract the coolant discharge piston 134, thereby drawing coolant into the coolant cylinder 132. Preferably, the high pressure pump displacement sensor 130 communicates to the PLC 128 that the cylinder 132 is fully charged before the machine tool 30 dwells before beginning to machine the workpiece 34.

Upon the cutting tool 34 slowing down to the desired machining feed rate of speed and before engaging the workpiece 36, the PLC 128 switches the hydraulic fluid control valve 216 to the discharge position to introduce hydraulic fluid to the upper chamber 176 of the hydraulic cylinder 140 which extends the coolant discharge piston 134 and discharges high pressure coolant from the high pressure coolant cylinder 132. To supply high pressure coolant to the cutting tool 34 while it is machining the workpiece 36, hydraulic fluid is preferably controllably supplied to the upper chamber 176 of the hydraulic cylinder 140 throughout the high pressure coolant discharge cycle to controllably displace the coolant discharge piston 134 toward its extended position 144.

If a second high pressure coolant cylinder is to be sequentially discharged to provide extended high pressure coolant flow, such as is depicted in FIG. 6B, the second high pressure pump displacement sensor 232 of the first high pressure coolant cylinder communicates to the PLC 128 when the first cylinder has finished discharging coolant so that the PLC 128 can switch the second hydraulic fluid control valve 216 to the discharge position to begin discharging high pressure coolant from the second high pressure coolant cylinder.

While high pressure coolant is being delivered to the cutting tool 34, flow of low pressure coolant through the coolant conduit 126 to the cutting tool 34 is prevented by the one-way check valve 202, positioned between the high and low pressure pumps, because of the pressure differential between the high and low pressure coolant on opposite sides of the valve 202. The check valve 202 also prevents high pressure coolant from backflowing through the low pressure pump 124 and into the coolant reservoir 125. Additionally, the high pressure switch 234 communicates with the PLC 128 during high pressure flow to monitor the pressure of the coolant so that a machine tool operator can be notified if there is an undesirable drop in coolant pressure during the high pressure coolant discharge cycle.

High pressure coolant flow to the cutting tool 34 is ended after machining of the workpiece 36 is completed. To cease high pressure coolant flow, the hydraulic fluid control valve 216 is switched to the recharge position by the PLC 128 after the machining completed sensor 68 communicates to the PLC 128 that the cutting tool 34 has reached its full depth of cut position, indicating that the workpiece 36 has been completely machined. Upon reversing the valve 216, hydraulic fluid flow is directed to the lower chamber 178 of the hydraulic cylinder 140 causing the coolant discharge piston 134 to begin retracting from the extended position and refilling the high pressure coolant cylinder 132. Thereafter, when the piston 134 reaches its fully retracted position 142, the high pressure pump displacement sensor 130 communicates to the PLC 128 that the coolant cylinder 132 has been refilled and is ready to supply high pressure coolant to the cutting tool 34.

To detect cutting tool failure or a coolant orifice obstruction, the PLC 128 preferably measures how much time it takes for the coolant cylinder 132 to refill with coolant after the high pressure coolant discharge cycle of each machining cycle and compares its recharge time with the calibrated value representing how long it should take to recharge following calibration where there is no cutting tool failure nor any plugged orifice during the calibration coolant discharge cycle. If it takes longer than the calibrated time for the cylinder to recharge, the PLC 128 signals an operator to inspect the cutting tool 34 for failure. If it takes less time to recharge than the calibrated time, the PLC 128 signals the operator to inspect the cutting tool 34 for a plugged coolant orifice. Preferably, if the operator is notified by the PLC 128 to inspect the cutting tool 34, the PLC 128 will also prevent the machine tool 30 from performing any further machining until the operator responds appropriately to the fault condition signal. However, if the recharge time is equal to the calibrated recharge time or is within an acceptable tolerance window of the calibrated time, operation of the machine tool 30 will continue uninterrupted.

To measure how much time it takes to recharge the high pressure coolant cylinder 132 following a high pressure coolant discharge cycle, the PLC 128 starts timing coolant recharge when it reverses the position of the hydraulic fluid control valve 216 after the workpiece 36 has been completely machined. Preferably, the PLC 128 switches the valve 216 a predetermined amount of time after the machining completed sensor 68 detects that the cutting tool 34 has completed machining the workpiece 36. Timing of coolant recharge is completed when the high pressure pump displacement sensor 130 communicates to the PLC 128 that the coolant discharge piston 134 has reached its fully retracted position 142 indicating that the high pressure coolant cylinder 132 is recharged with coolant.

The coolant recharge time is stored as AV in memory register 230 of the PLC 128 and compared with the calibrated coolant recharge time previously stored as CV in memory register 228. If the actual recharge time, AV, is about equal to the calibrated discharge time, CV, or within an acceptable tolerance window of CV, operation of the machine tool 30 continues uninterrupted. Otherwise, if the actual recharge time, AV, is greater than the calibrated recharge time, CV, and also outside of the accepted tolerance window of CV, the operator is signaled by the PLC 128 to inspect the cutting tool 34 for failure. Likewise, if AV is less than CV and not within the tolerance window of CV, the operator is notified to inspect the tool 34 for a plugged orifice. Preferably, upon signaling the operator, machine tool operation is interrupted until the operator indicates to the PLC 128 that the cutting tool 34 has been inspected and is suitable to resume machine tool operation.

For example, if it has been determined that it should take approximately five seconds to recharge the high pressure coolant cylinder 132 following the high pressure coolant discharge cycle of a machining cycle where there was no cutting tool failure or orifice obstruction, the value of five seconds will be stored as CV in memory register 228. If it has been determined that it could take as little as four seconds and as much as six seconds for the cylinder 132 to recharge where there was no failure or blockage to account for normal machining variations, the tolerance window will be plus or minus one second of CV. Therefore, normal operation of the machine tool 30 will continue uninterrupted so long as it takes between four and six seconds to recharge the high pressure coolant cylinder 132 after each high pressure coolant discharge cycle. However, the machine tool operator will be signaled by the PLC 128 to inspect the cutting tool 34 if it takes less than four seconds or greater than six seconds to recharge the coolant cylinder 132.

Preferably, to perform calibration, high pressure coolant is supplied during the high pressure coolant discharge cycle of a calibration machining cycle where it is known that the cutting tool 34 did not fail nor did any coolant orifice or passage of the tool 34 become plugged. During calibration, the time it takes for the coolant cylinder 132 to recharge is measured and stored as CV in memory register 228. If desired, the coolant cylinder recharge time may be measured during several calibration machining cycles to determine an average coolant cylinder recharge time and this average recharge time can be stored as CV. Furthermore, if several cycles are run during calibration, the recharge times may be statistically analyzed to determine the statistical variance in calibration recharge times for use as the tolerance window of CV to account for differences in variations in the volume of high pressure coolant delivered to the cutting tool 34 due to normal machining variations.

High Pressure Coolant Flush

In operation of the coolant delivery apparatus depicted in FIG. 6D, before supplying coolant under high pressure to the high pressure workpiece flushing station 43, the workpiece 47 is transferred into the station 43. After the workpiece 47 is located and clamped in the fixture 85, high pressure coolant flow is initiated by the PLC 128 when the hydraulic fluid switching valve 216 is switched to its discharge position thereby directing high pressure coolant from the high pressure coolant cylinder 132 through the coolant discharge nozzle 83 and into the hole 45 of the workpiece 47 to flush and clean the hole 45. After the high pressure coolant discharge cycle is completed and the hole 45 has been flushed with coolant to clear it of chips and debris, high pressure coolant flow is stopped when the PLC 128 switches the hydraulic fluid switching valve 216 to its recharge position, also thereby enabling the high pressure coolant cylinder 132 to recharge with coolant. After flushing is completed, the cleaned workpiece 47 is unclamped and transferred out of the station 43 and, thereafter, another workpiece to be cleaned is fixtured in the station 43 for flushing.

Second Embodiment

In operation of the coolant delivery apparatus 120' illustrated in FIG. 10, upon startup, low pressure coolant is supplied by the low pressure pump 124 to the rotary union 78, cutting tool 34 and cylinder 240 of the high pressure pump 122' to recharge it, if it is necessary to recharge it. When the upper high pressure pump displacement sensor 130 communicates to the PLC 128 that the cylinder 240 is fully charged with coolant and the cutting tool 34 is preferably moving toward the workpiece at its desired feed rate immediately before machining the workpiece 36, the hydraulic fluid control valve 216 is switched by the PLC 128 to provide hydraulic fluid to the upper chamber 250 of the high pressure pump cylinder 240 to begin discharging high pressure coolant from the pump 122'. Preferably, the cylinder 240 discharges high pressure coolant at least until the machining completed sensor 68 communicates to the PLC 128 that the cutting tool 34 has reached its full depth of cut position within the workpiece 36 thereafter causing the PLC 128 to reverse the valve 216.

With the hydraulic fluid control valve 216 reversed, coolant from the low pressure pump 124 enters the lower chamber 252 of the high pressure coolant cylinder 240 and urges the piston 248 toward its fully retracted position 254 while also recharging the cylinder 240 with coolant. As the piston 248 is urged toward its fully retracted position 254, it displaces hydraulic fluid from the upper chamber 250. Hydraulic fluid displaced while the high pressure cylinder 240 is being refilled with coolant simply returns to the hydraulic fluid reservoir 212. Of course, the cylinder 240 is recharged with coolant until the piston 248 reaches its fully retracted position 254.

Although coolant chamber recharge time can be measured to determine cutting tool failure or a plugged coolant orifice, the lower high pressure pump displacement sensor 232, as is depicted in FIG. 10, is preferably used to measure the time it takes for the cylinder 240 to discharge the desired predetermined amount of coolant during the high pressure coolant discharge cycle of each machining cycle. Therefore, the PLC 128 measures the time it takes to discharge this desired predetermined amount of coolant during each machining cycle by measuring how long it takes for the piston 248 to travel from its fully retracted position 254 toward the extended position 256 shown in FIG. 12 when it is adjacent the second high pressure pump displacement sensor 232. This coolant discharge time is then stored as AV in memory register 230 and compared to CV in memory register 228 to determine cutting tool failure or orifice obstruction. The calibrated coolant discharge time, CV, is preferably determined by measuring the time it takes to discharge the desired predetermined volume of coolant during the high pressure coolant discharge cycle of at least one calibration machining cycle where there is no cutting tool failure or orifice obstruction.

Alternatively, if the second high pressure pump displacement sensor 232 is located to detect when the piston 248 has forced the desired predetermined amount of coolant from the cylinder 240 necessary to continuously supply the cutting tool 34 with high pressure coolant during the entire high pressure coolant discharge cycle of each machining cycle, the PLC 128 can detect whether the piston 248 reaches the second sensor 232 during the coolant discharge cycle and, if so, whether the second sensor 232 communicates to the PLC 128 that the piston 248 again passes the sensor 232 while the cylinder 240 is recharging with coolant immediately after the coolant discharge cycle. Preferably, the PLC 128 will notify the operator to inspect the cutting tool 34 if the piston 248 never reaches the second sensor 232 during the coolant discharge cycle or if it reaches the sensor 232 once during the coolant discharge cycle and again while the cylinder 240 is being recharged with coolant. Otherwise, machine tool operation will continue uninterrupted if the piston 248 reaches the sensor 232 only once during the coolant discharge cycle and not at all while the cylinder 240 is recharging.

While the present invention has been disclosed in connection with the preferred embodiments thereof, it should be understood that there will be other embodiments which fall within the spirit and scope of the invention and that the invention is susceptible to modification, variation and change without departing from the scope and fair meaning of the following claims.

What is claimed is:

1. A coolant delivery apparatus having an orifice for directing a flow of coolant onto a workpiece comprising:
   a low pressure supply of coolant;
   a coolant discharge cylinder for supplying coolant to the orifice under a pressure greater than the pressure of coolant from said low pressure coolant supply; and
   wherein said low pressure coolant supply recharges said high pressure coolant discharge cylinder with coolant.

2. The coolant delivery apparatus of claim 1 also comprising a cutting tool in fluid flow communication with the orifice for receiving coolant from at least said high pressure coolant discharge cylinder.

3. The coolant delivery apparatus of claim 1 wherein the orifice is located relative to a hole in the workpiece for flushing said hole with coolant from said high pressure coolant discharge cylinder for flushing chips of workpiece material and any other debris free of said hole to clean said hole.

4. The coolant delivery apparatus of claim 1 wherein coolant from said low pressure coolant supply is supplied to the orifice.

5. The coolant delivery apparatus of claim 4 wherein coolant from said low pressure coolant supply is supplied to the orifice at all times other than when coolant is provided to the orifice from said high pressure coolant discharge cylinder.

6. The coolant delivery apparatus of claim 1 also comprising a coolant conduit in fluid flow communication with said low pressure coolant supply and said high pressure coolant discharge cylinder for communicating coolant flow at least from said high pressure coolant discharge cylinder to the orifice for directing coolant flow onto the workpiece.

7. The coolant delivery apparatus of claim 6 also comprising a valve in operable communication with said conduit for directing coolant flow from said high pressure coolant discharge cylinder to the orifice while preventing coolant flow from said low pressure coolant supply to the orifice and directing coolant flow from said low pressure coolant supply to the orifice when said high pressure coolant discharge cylinder is not providing coolant to the orifice.

8. The coolant delivery apparatus of claim 1 wherein said high pressure coolant discharge cylinder comprises a generally cylindrical sidewall, first and second endwalls with an opening in one of said endwalls in fluid flow communication with said coolant conduit, and said sidewall and endwalls defining a cavity therein; a reciprocable piston received in said cavity and said piston, said first endwall and said sidewall defining a chamber for receiving coolant therein and said piston being movable within said cavity from a first position when said chamber is filled with coolant toward a position disposed from said first position for discharging coolant from said coolant chamber through said endwall opening into said coolant conduit to the cutting tool orifice and movable from a position disposed from said first position toward said first position to enable said chamber to be recharged with coolant; and a drive in operable communication with said coolant discharge cylinder for moving said piston from said first position to said position disposed from said first position.

9. The coolant delivery apparatus of claim 2 also comprising a computer in communication with said high pressure coolant discharge cylinder for monitoring coolant flow.

10. The coolant delivery apparatus of claim 9 wherein said computer monitors said coolant flow by measuring the volume of coolant discharged by said high pressure coolant discharge cylinder to the orifice of said cutting tool during each machining cycle of said cutting tool, after each machining cycle said computer compares said volume of coolant discharged by said high pressure discharge cylinder to the cutting tool orifice with a known volume of coolant required to continuously supply coolant from the high pressure coolant discharge cylinder to the cutting tool orifice during a machining cycle where said cutting tool has not failed nor has any orifice of said cutting tool become obstructed and generates a signal to inspect said cutting tool if said volume of coolant discharged is not about the same as said known volume of coolant required to continuously supply coolant from said high pressure coolant discharge cylinder to the cutting tool orifice during said machining cycle where said cutting tool has not failed nor has the orifice of said cutting tool become obstructed.

11. A coolant delivery apparatus having an orifice for directing a flow of coolant onto a workpiece comprising:

a low pressure supply of coolant;

a supply of coolant under a pressure greater than the pressure of coolant from said low pressure coolant supply; and a coolant conduit in fluid flow communication with said low pressure coolant supply and said high pressure coolant supply for communicating coolant flow at least from said high pressure coolant supply to the orifice for directing coolant flow onto the workpiece.

12. The coolant delivery apparatus of claim 11 also comprising a valve in operable communication with said conduit for directing coolant flow from said high pressure coolant supply to the orifice while preventing coolant flow from said low pressure coolant supply to the orifice and directing coolant flow from said low pressure coolant supply to the orifice when said high pressure coolant supply is not providing coolant to the orifice.

13. The coolant delivery apparatus of claim 11 wherein the orifice is located relative to a hole in the workpiece for flushing said hole with coolant from said high pressure coolant supply for flushing chips of workpiece material and any other debris free of said hole to clean said hole.

14. The coolant delivery apparatus of claim 11 also comprising a cutting tool for machining the workpiece and said cutting tool in communication with the orifice for directing coolant from said high pressure coolant supply through the orifice onto the workpiece at least while said cutting tool is machining the workpiece for lubricating and cooling said cutting tool and supplying coolant from said low pressure coolant supply through the orifice when coolant is not being supplied from said high pressure coolant supply to the orifice.

15. The coolant delivery apparatus of claim 14 wherein coolant from said low pressure coolant supply is provided to the orifice at all times other than when coolant is provided to the orifice from said high pressure coolant supply.

16. The coolant delivery apparatus of claim 14 also comprising a computer in communication with said high pressure coolant supply for measuring coolant flow from said high pressure coolant supply to the orifice of said cutting tool for determining whether said cutting tool has failed or the cutting tool orifice has become obstructed.

17. The coolant delivery apparatus of claim 16 wherein said computer measures said coolant flow by measuring the volume of coolant discharged by said high pressure coolant supply to the orifice of said cutting tool during each machining cycle of said cutting tool, after each machining cycle said computer compares said volume of coolant discharged by said high pressure coolant supply to the cutting tool orifice with a known volume of coolant required to continuously supply coolant from the high pressure coolant supply to the cutting tool orifice during a machining cycle where said cutting tool has not failed nor has any orifice of said cutting tool become obstructed and generates a signal to inspect said cutting tool if said volume of coolant discharged is not about the same as said known volume of coolant required to continuously supply coolant from said high pressure coolant supply to the cutting tool orifice during said machining cycle where said cutting tool has not failed nor has any orifice of said cutting tool become obstructed.

18. The coolant delivery apparatus of claim 11 wherein said high pressure coolant supply comprises a coolant discharge cylinder having a generally cylindrical sidewall, first and second endwalls with an opening in one of said endwalls in fluid flow communication with said coolant conduit, and said sidewall and endwalls defining a cavity therein; a reciprocable piston received in said cavity and said piston, said first endwall and said sidewall defining a chamber for receiving coolant therein and said piston being movable within said cavity from a first position when said chamber is filled with coolant toward a position disposed from said first position for discharging coolant from said coolant chamber through said endwall opening into said coolant conduit to the cutting tool orifice and movable from a position disposed from said first position toward said first position to enable said chamber to be recharged with coolant; and a drive in operable communication with said coolant discharge cylinder for moving said piston from said first position to said position disposed from said first position.

19. The coolant delivery apparatus of claim 18 wherein coolant from said low pressure coolant supply is provided to said high pressure coolant supply to recharge said high pressure coolant discharge cylinder with coolant.

20. A coolant delivery apparatus for a machine tool having a cutting tool for machining a workpiece during a machining cycle of the machine tool with the cutting tool having at least one orifice therein adjacent a cutting surface of the cutting tool for distributing coolant to the cutting surface, comprising:

a high pressure pump in fluid flow communication with the cutting tool orifice for supplying coolant under pressure to the cutting tool orifice at least while the cutting tool is engaging the workpiece to machine the workpiece;

a supply of coolant under low pressure in fluid flow communication with the cutting tool orifice for supplying coolant to the cutting tool orifice when said high pressure pump is not supplying coolant to the cutting tool orifice and wherein coolant from said low pressure coolant supply supplies coolant to the cutting tool orifice at a pressure less than that of said high pressure pump; and a coolant conduit in fluid flow communication with said high pressure pump, said low pressure coolant supply and the cutting tool orifice for facilitating passage of coolant to the cutting tool orifice.

21. The coolant delivery apparatus of claim 20 wherein coolant from said high pressure pump is selectively supplied to the cutting tool orifice and coolant from said low pressure pump is selectively supplied to the cutting tool orifice at least when said high pressure pump is not supplying coolant to the cutting tool orifice.

22. The coolant delivery apparatus of claim 21 also comprising a valve in operable communication with said conduit for permitting said high pressure pump to provide coolant to the cutting tool orifice and permitting said low pressure coolant supply to supply coolant to the cutting tool orifice when said high pressure pump is not supplying coolant to the cutting tool orifice.

23. The coolant delivery apparatus of claim 20 wherein said low pressure coolant supply supplies coolant to at least one other cutting tool even while said high pressure pump is supplying coolant under pressure to the cutting tool orifice of the machine tool.

24. The coolant delivery apparatus of claim 20 wherein every machining cycle of the machine tool has a high pressure coolant discharge cycle wherein coolant is delivered to the cutting tool orifice from said high pressure pump at least while the cutting tool is engaging the workpiece to machine it.

25. The coolant delivery apparatus of claim 24 wherein said high pressure coolant discharge cycle extends from shortly before the cutting tool engages the workpiece to machine it until shortly after the cutting tool has completed machining the workpiece.

26. The coolant delivery apparatus of claim 20 also comprising a computer in communication with said high pressure pump for monitoring coolant flow from said high pressure pump to the cutting tool orifice for determining whether the cutting tool has failed or the cutting tool orifice has become obstructed.

27. The coolant delivery apparatus of claim 26 wherein said computer monitors said coolant flow by measuring the volume of coolant discharged by said high pressure pump to the cutting tool orifice during each machining cycle of the machine tool, after each machining cycle said computer compares said volume of coolant discharged from said high pressure pump with a known volume of coolant required to continuously supply coolant from said high pressure pump to the cutting tool orifice during a machining cycle where the cutting tool has not failed nor has any orifice of the cutting tool become obstructed and generates a signal to inspect the cutting tool if said volume of coolant discharged from said high pressure pump is not about the same as said known volume of coolant required to continuously supply coolant from said high pressure pump to the cutting tool orifice during said machining cycle where the cutting tool has not failed nor has any orifice of the cutting tool become obstructed.

28. The coolant delivery apparatus of claim 20 wherein said high pressure pump comprises a coolant discharge cylinder having a generally cylindrical sidewall, first and second endwalls with an opening in one of said endwalls in fluid flow communication with said coolant conduit, and said sidewall and endwalls defining a cavity therein; a reciprocable piston received in said cavity and said piston, said first endwall and said sidewall defining a chamber for receiving coolant therein and said piston being movable within said cavity from a first position when said chamber is filled with coolant toward a position disposed from said first position for discharging coolant from said coolant chamber through said endwall opening into said coolant conduit to the cutting tool orifice and movable from a position disposed from said first position toward said first position to enable said chamber to be recharged with coolant; and a drive in operable communication with said coolant discharge cylinder for moving said piston from said first position to said position disposed from said first position.

29. The coolant delivery apparatus of claim 28 wherein said drive comprises said piston, one of said endwalls and said sidewall defining a second chamber within said cylinder for receiving hydraulic fluid therein to urge said piston to move from said first position toward said position disposed from said first position for discharging coolant under pressure from said coolant chamber into said conduit and to the cutting tool orifice.

30. The coolant delivery apparatus of claim 28 wherein said high pressure pump comprises at least two coolant discharge cylinders in operable communication with at least one drive for supplying coolant under pressure to a cutting tool.

31. The coolant delivery apparatus of claim 28 also comprising:

a sensor in communication with the machine tool for indicating when the cutting tool has completed machining the workpiece;

a sensor in communication with said coolant cylinder of said high pressure pump to indicate when said coolant chamber has been recharged with coolant; and a computer in communication with said drive, said sensors and at least two memory registers for storing data therein with one of said memory registers for storing a calibrated value representative of coolant flow volume from said high pressure pump to the cutting tool orifice during a calibration machining cycle of the machine tool where the workpiece is completely machined by the cutting tool without the cutting tool failing nor any orifice of the cutting tool becoming plugged and the other of said memory registers for storing a value representative of coolant flow volume from said high pressure pump cylinder to the cutting tool orifice during each machining cycle of the machining tool, said computer comparing said calibrated coolant flow volume value stored in said one of said memory registers with said actual coolant flow volume value stored in said other of said memory registers, and said computer generating a signal to inspect the cutting tool if said actual coolant flow volume value is not about equal to said calibrated coolant flow volume value.

32. The coolant delivery apparatus of claim 31 wherein said calibrated coolant flow volume value is the time it takes for said high pressure pump coolant cylinder to recharge with coolant during said calibration machining cycle having no cutting tool failure nor cutting tool orifice obstruction and wherein for every machining cycle said computer determines said actual coolant flow volume value by communicating with said machining completed sensor and said high pressure pump displacement sensor to measure the time it takes for said high pressure pump coolant cylinder to recharge with coolant after said machining completed sensor indicates to said computer that machining of the workpiece has been completed and said computer providing a signal to inspect the cutting tool after comparing said actual coolant flow volume value with said calibrated coolant flow volume value if said high pressure cylinder recharge time is not about the same as said calibrated high pressure cylinder recharge time.

33. The coolant delivery apparatus of claim 32 wherein said high pressure pump displacement sensor comprises a proximity sensor located adjacent said coolant cylinder to sense when said piston is in said first position for indicating to said computer when said cylinder chamber is fully charged with coolant and ready to be discharged and said computer measuring the time it takes to recharge said cylinder chamber with coolant by measuring from when said drive begins urging said piston from a position disposed from said first position toward said first position after said machining completed sensor communicates to said computer that the workpiece has been machined until said proximity sensor communicates to said computer that said piston has reached said first position indicating said cylinder chamber is recharged with coolant.

34. The coolant delivery apparatus of claim 28 wherein said drive comprises a hydraulic drive in operable communication with said piston for reciprocating said piston between said first position and a position disposed from said first position thereby causing coolant to discharge under pressure from said coolant cylinder into said conduit and to the cutting tool orifice by urging said piston to move from said first position to a position disposed from said first position and facilitating recharging said chamber of said cylinder with coolant by urging said piston to move from a position disposed from said first position toward said first position.

35. The coolant delivery apparatus of claim 34 also comprising a sensor in communication with the machine tool for indicating when the cutting tool has completed machining the workpiece; and a computer in communication with said drive and said machining completed sensor for causing said drive to urge said piston to move from a position disposed from said first position toward said first position to recharge said coolant cylinder after said machining completed sensor indicates to said computer that machining of the workpiece has been completed.

36. The coolant delivery apparatus of claim 35 wherein said computer is a programmable logic controller.

37. The coolant delivery apparatus of claim 20 also comprising a workpiece having a hole and an orifice located for directing coolant into said hole and said orifice in communication with said high pressure pump for directing high pressure coolant from said high pressure pump into said hole for cleaning and flushing chips and any other debris from said hole.

38. A method of delivering coolant to an orifice for directing coolant onto a workpiece comprising:

(a) providing a low pressure supply of coolant and a supply of coolant at a pressure greater than the low pressure coolant supply;

(b) supplying coolant from the higher pressure coolant supply to the orifice for directing coolant onto the workpiece; and (c) supplying coolant from the low pressure coolant supply to the higher pressure coolant supply.

39. The method of claim 38 also comprising supplying coolant from the low pressure coolant supply to the orifice at least at some period when the higher pressure coolant supply is not supplying coolant to the orifice.

40. The method of claim 38 wherein the higher pressure coolant supply is a discharge cylinder and during step (c) coolant is supplied from the low pressure coolant supply to the discharge cylinder to recharge the cylinder with coolant.

41. The method of claim 40 also comprising providing a cutting tool carrying the orifice; before step (b) advancing the cutting tool toward the workpiece; during step (b) discharging coolant from the discharge cylinder to the orifice at least while the cutting tool is engaging the workpiece to machine it; and after step (b) and during step (c) supplying coolant from the low pressure coolant supply to the orifice.

42. The method of claim 41 also comprising providing a computer in communication with the higher pressure coolant supply for monitoring coolant flow to the orifice and during step (b) monitoring coolant flow to the orifice for detecting breakage of the cutting tool or an obstruction of the orifice.

43. The method of claim 40 also comprising providing a fixture for receiving and locating the workpiece relative the orifice so that coolant is directed into an opening in the workpiece during step (b) for flushing debris and chips free of the opening; before step (b) receiving a workpiece into the fixture and locating an opening in the workpiece relative to the orifice so that coolant is directed into the opening during step (b); and after step (b) removing and transferring the workpiece from the fixture.

44. A method of delivering coolant to a cutting tool for machining a workpiece during a machining cycle of a machine tool with the cutting tool having at least one orifice therein adjacent a cutting surface of the cutting tool for distributing coolant to the cutting surface comprising:

(a) providing a high pressure pump in fluid flow communication with the cutting tool orifice for supplying coolant under pressure to the cutting tool orifice, at least while the cutting tool is machining the workpiece, providing a low pressure pump in fluid flow communication with the cutting tool orifice for supplying coolant to the cutting tool orifice at a pressure less than the high pressure pump;

(b) advancing the cutting tool toward the workpiece;

(c) supplying coolant from the high pressure pump to the cutting tool orifice;

(d) machining the workpiece with the cutting tool while high pressure coolant is being supplied to the cutting tool orifice for lubricating and cooling the cutting tool;

(e) stopping the flow of coolant from the high pressure pump shortly after the cutting tool has completed machining the workpiece;

(f) supplying coolant from the low pressure pump to the cutting tool orifice;

(g) retracting the cutting tool away from the workpiece; and (h) removing the workpiece from the machine tool and thereafter loading another workpiece into the machine tool to be machined.

45. The method of claim 44 also comprising before step (b) supplying coolant from the low pressure pump to the cutting tool orifice.

46. The method of claim 44 also comprising measuring the volume of coolant flow from the high pressure pump in steps (c), (d) and (e), determining a calibrated coolant flow volume representing the volume of coolant that should be supplied by the high pressure pump to the cutting tool orifice during steps (c), (d) and (e) if the cutting tool has not failed nor any orifice of the cutting tool become obstructed, comparing the actual coolant flow volume with the calibrated coolant flow volume, and generating a signal indicating that the cutting tool should be inspected if the volume of coolant flow during steps (c), (d) and (e) is not about the same as the calibrated coolant flow volume.

47. The method of claim 44 wherein during step (b) the cutting tool slows its movement toward the workpiece before engaging the workpiece to machine it and coolant is supplied from the high pressure pump to the cutting tool orifice during step (c) while the cutting tool is moving slowly toward the workpiece, and after step (d) the cutting tool dwells a short period of time before it is retracted from the workpiece and coolant is supplied from the high pressure pump to the cutting tool orifice while the cutting tool is dwelling to cool the cutting tool and flush chips of workpiece material from the cutting tool before it is retracted from the workpiece before stopping coolant flow from the high pressure pump in step (e).

48. The method of claim 47 wherein the high pressure pump provided in step (a) comprises a coolant discharge cylinder having a generally cylindrical sidewall, spaced apart end walls with an opening in one of the end walls in fluid flow communication with the orifice, and the sidewall and end walls defining a cavity therein, a reciprocable piston received in the cavity and the piston, one of the end walls and sidewall defining a chamber for receiving coolant therein and the piston being movable within the cavity from a first position when the cylinder chamber is filled with coolant toward a position disposed from the first position for discharging coolant from the cylinder to the cutting tool orifice and movable from a position disposed from the first position toward the first position to enable the cylinder chamber to be recharged with coolant, and a drive in operable communication with the piston for performing steps (c) and (d) by urging the piston from the first position toward a position disposed from the first position to discharge coolant from the cylinder during steps (c) and (d).

49. The method of claim 48 wherein during at least step (f) the drive urges the piston from a position disposed from the first position toward the first position to recharge the high pressure cylinder chamber with coolant.

50. The method of claim 49 also comprising:

(1) providing a sensor in communication with the machine tool for indicating when the cutting tool has completed machining the workpiece, providing a sensor in communication with the high pressure pump coolant cylinder, and providing a computer in communication with the machining completed sensor and high pressure pump displacement sensor and the computer communicating with at least two memory registers for storing data therein;

(2) storing in one of the memory registers of the computer a calibrated value representative of coolant flow from the high pressure pump to the cutting tool orifice during the calibration machining cycle;

(3) during at least steps (c), (d) and (e), the computer communicating with the machining completed sensor and the high pressure pump displacement sensor to generate a value representative of coolant flow from the high pressure pump to the cutting tool orifice;

(4) storing the value representative of coolant flow from the high pressure pump to the cutting tool orifice measured in step (3) in the other memory register;

(5) comparing the calibrated value representative of coolant flow in the one memory register with the value representative of coolant flow in the other memory register;

(6) generating a signal indicating that the the cutting tool has failed if the value representative of coolant flow is greater than about the value representative of calibrated coolant flow; and (7) generating a signal indicating that the cutting tool has a plugged coolant orifice if the value representative of coolant flow is less than about the value representative of calibrated coolant flow.

51. The method of claim 50 wherein machine tool operation is stopped after a signal is generated by the computer for permitting inspection of the cutting tool and preventing machining another workpiece with a cutting tool that has failed or that has a plugged cutting tool orifice.

52. The method of claim 50 wherein the high pressure pump displacement sensor comprises a proximity sensor in communication with the high pressure coolant cylinder for communicating to the computer when the piston is in its first position indicating that the coolant cylinder is filled with coolant and comprising the steps of:

(1) determining the calibrated value representative of coolant flow by the computer measuring how much time it takes to recharge the coolant cylinder with coolant after the high pressure coolant cylinder has discharged coolant to the cutting tool orifice during a calibration machining cycle during which the cutting tool has machined at least one workpiece without the cutting tool failing nor any cutting tool orifice becoming obstructed;

(2) storing the calibrated high pressure cylinder recharge time as the calibrated value representative of coolant flow in one of the memory registers of the computer;

(3) determining the value representative of coolant flow by the computer communicating with the machining completed sensor and the proximity sensor to measure, after step (e), how much time it takes for the piston to travel from a position disposed from its first position to its first position;

(4) storing the high pressure cylinder recharge time as the value representative of coolant flow in the other of the memory registers of the computer;

(5) comparing the high pressure coolant cylinder recharge time with the calibrated high pressure coolant cylinder recharge time;

(6) generating a signal to inspect the cutting tool for failure if the high pressure cylinder recharge time is greater than the calibrated high pressure cylinder recharge time; and (7) generating a signal to inspect the cutting tool for an obstruction in any cutting tool orifice if the high pressure cylinder recharge time is less than the calibrated high pressure cylinder recharge time.

53. The method of claim 50 wherein the calibrated value representative of coolant flow includes a first value representative of a minimum acceptable calibrated coolant flow value and a second value representative of a maximum acceptable calibrated coolant flow value to provide a tolerance window extending from the minimum acceptable coolant flow value to the maximum acceptable coolant flow value to account for variations in coolant flow required to be supplied to the cutting tool orifice from the high pressure pump due to workpiece machining variations.

54. The method of claim 53 wherein during determining the calibrated flow volume value:

measuring the time it takes to recharge the high pressure coolant cylinder after machining at least two workpieces;

calculating the average of the high pressure coolant cylinder recharge times;

calculating the variance in the high pressure coolant cylinder recharge times;

storing the average and variance as the calibrated value representative of coolant flow in the one of the memory registers;

comparing the high pressure coolant recharge time stored in the other memory register of the computer for every machining cycle with the calibrated average and variance;

generating the signal to inspect the cutting tool for failure if the high pressure cylinder recharge time is greater than the calibrated average plus the variance in the average calibrated high pressure cylinder recharge times; and generating the signal to inspect the cutting tool for an obstruction in any coolant orifice if the high pressure cylinder recharge time is less than the calibrated average minus the variance in the average calibrated high pressure cylinder recharge times.

* * * * *